(12) United States Patent
Kogi et al.

(10) Patent No.: US 10,322,898 B2
(45) Date of Patent: Jun. 18, 2019

(54) MEDIUM FEEDING DEVICE, IMAGE READING APPARATUS, AND RECORDING APPARATUS

(71) Applicant: SEIKO EPSON CORPORATION, Tokyo (JP)

(72) Inventors: Shinsuke Kogi, Fukuoka (JP); Masaki Namiki, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/828,590

(22) Filed: Dec. 1, 2017

(65) Prior Publication Data
US 2018/0179006 A1 Jun. 28, 2018

(30) Foreign Application Priority Data

Dec. 28, 2016 (JP) .................. 2016-256416

(51) Int. Cl.
*B65H 7/06* (2006.01)
*B65H 7/02* (2006.01)
(Continued)

(52) U.S. Cl.
CPC .............. *B65H 7/06* (2013.01); *B65H 3/06* (2013.01); *B65H 3/063* (2013.01); *B65H 3/0653* (2013.01); *B65H 3/5284* (2013.01); *B65H 3/565* (2013.01); *B65H 7/02* (2013.01); *B65H 7/08* (2013.01); *B65H 7/125* (2013.01); *B65H 7/14* (2013.01); *H04N 1/00477* (2013.01); *H04N 1/00488* (2013.01); *B65H 2402/46* (2013.01); *B65H 2404/133* (2013.01); *B65H 2511/11* (2013.01); *B65H 2511/13* (2013.01); *B65H 2511/413* (2013.01); *B65H 2511/528* (2013.01); *B65H 2513/41* (2013.01); *B65H 2553/51* (2013.01); *B65H 2701/1311* (2013.01);
(Continued)

(58) Field of Classification Search
CPC ... B65H 7/08; B65H 7/12; B65H 7/06; B65H 2511/13; H04N 1/00718
See application file for complete search history.

(56) References Cited

U.S. PATENT DOCUMENTS 4,136,454 A * 1/1979 Jenkins .................... B07C 5/08
33/501.03
5,912,448 A * 6/1999 Sevier ................ H04N 1/00681
235/454
(Continued)

FOREIGN PATENT DOCUMENTS

JP 4773384 B2 9/2011
JP 5409857 B1 2/2014

*Primary Examiner* — Jeremy R Severson

(57) ABSTRACT

A medium feeding device includes an imaging unit which images a medium tip end portion from a position of facing a face of the medium on a downstream side of a nipping position of the medium using a feeding unit and a separating unit; and a determining unit which determines whether or not there is transport disorder by evaluating a state of a boundary between a path member which forms a medium transport path and a medium tip end from image data obtained by the imaging unit, in which the determining unit sets a rectangular determining region including at least a part of the boundary with respect to the image data, and determines whether or not there is transport disorder based on a length of a boundary in the determining region.

8 Claims, 17 Drawing Sheets

(51) Int. Cl.
*B65H 3/06* (2006.01)
*B65H 3/56* (2006.01)
*H04N 1/00* (2006.01)
*B65H 7/08* (2006.01)
*B65H 3/52* (2006.01)
*B65H 7/12* (2006.01)
*B65H 7/14* (2006.01)

(52) U.S. Cl.
CPC ...... *B65H 2801/06* (2013.01); *B65H 2801/39* (2013.01); *H04N 1/00718* (2013.01)

(56) References Cited

U.S. PATENT DOCUMENTS

| | | | | |
|---|---|---|---|---|
| 6,064,778 | A * | 5/2000 | Pasco | G06K 9/3283 |
| | | | | 382/289 |
| 7,457,012 | B2 * | 11/2008 | Fang | B65H 7/06 |
| | | | | 358/498 |
| 8,774,700 | B2 * | 7/2014 | Shikama | B65H 7/08 |
| | | | | 271/227 |
| 9,085,428 | B2 * | 7/2015 | Ikeda | B65H 7/12 |
| 2008/0197562 | A1 | 8/2008 | Yoshida et al. | |
| 2011/0141504 | A1 * | 6/2011 | Utsunomiya | H04N 1/00681 |
| | | | | 358/1.9 |
| 2014/0054839 | A1 | 2/2014 | Umi et al. | |

* cited by examiner

MEDIUM FEEDING DEVICE, IMAGE READING APPARATUS, AND RECORDING APPARATUS

BACKGROUND

1. Technical Field

The present invention relates to a medium feeding device which feeds a medium, and an image reading apparatus and a recording apparatus provided with the medium feeding device.

2. Related Art

A recording apparatus represented by a printer, or an image reading apparatus represented by a scanner is provided with a feeding device which automatically sends a sheet (also referred to as auto document feeder (ADF)), and is configured so as to perform automatic sending and reading of a plurality of sheets.

Here, in general, a feeding device is provided with a separating mechanism which separates sheets; however, there is also a case in which separation is failed, and there is a concern of causing a breakage of a device, when continuing sending of sheets in such a case. In Japanese Patent No. 4,773,384, a configuration in which a driven roller which rotates following a sheet is provided, a rotation of the driven roller is detected by a rotary encoder, and jamming is determined by detecting a movement amount of the sheet based on the detected result is disclosed.

The jamming detecting unit in Japanese Patent No. 4,773,384 determines jamming, using a rotation of the driven roller which comes into contact with a sheet; however, when a frictional force between the driven roller and a sheet decreases due to aging degradation, or the like, of the driven roller, there is a concern that the driven roller may stop, and it may be erroneously detected as jamming, regardless of transporting of the sheet.

SUMMARY

An advantage of some aspects of the invention is to provide a medium feeding device which can detect transport disorder of a medium more accurately, and an image reading apparatus and a recording apparatus each provided with the medium feeding device.

A medium feeding device according to a first aspect of the invention includes a medium mounting unit on which a medium is mounted; a feeding unit which feeds the medium from the medium mounting unit; a separating unit which separates the medium between the feeding unit and the separating unit by nipping the medium; an imaging unit which images a medium tip end portion from a position of facing a face of the medium on a downstream side of a nipping position of the medium using the feeding unit and the separating unit; and a determining unit which determines whether or not there is transport disorder by evaluating a state of a boundary between a path member which forms a medium transport path and a medium tip end from image data obtained by the imaging unit.

In this configuration, since the medium feeding device is provided with the imaging unit which images the medium tip end portion from the position of facing the face of the medium on the downstream side of the nipping position of the medium using the feeding unit and the separating unit, and the determining unit which determines whether or not there is a transport disorder by evaluating a state of the boundary between the path member which forms the medium transport path and the medium tip end from image data obtained by the imaging unit, it is possible to more reliably determine the state of the medium tip end, and detect a transport disorder of the medium more accurately.

In the medium feeding device, the determining unit may set a rectangular determining region including at least a part of the boundary with respect to the image data, and may determine whether or not there is the transport disorder based on a length of the boundary in the determining region.

In this configuration, since the determining unit sets the rectangular determining region including at least a part of the boundary with respect to the image data, and determines whether or not there is the transport disorder based on the length of the boundary in the determining region, it is possible to determine whether or not there is the transport disorder using an easy method.

In the medium feeding device, the determining unit determines whether or not there is the transport disorder based on an angle of the boundary in the determining region to a medium width direction as a direction orthogonal to a medium transport direction.

In the configuration, since the determining unit determines whether or not there is the transport disorder based on the angle of the boundary in the determining region to the medium width direction as the direction orthogonal to the medium transport direction, it is possible to determine whether or not there is the transport disorder using an easy method, and in particular, it is possible to easily detect skewing as one of the transport disorder.

In the medium feeding device, the determining unit may obtain averaged brightness as a value in which brightness of a pixel group which goes along the medium width direction as a direction orthogonal to the medium transport direction is averaged along the medium transport direction from the image data, and the determining unit may obtain a first threshold value as a threshold value with respect to the averaged brightness for determining a present state of a medium, and a second threshold value as a threshold value for determining an absent state of the medium which is lower than the first threshold value, and may determine whether or not there is the transport disorder based on highs and lows of a value with high brightness with respect to the first threshold value, and highs and lows of a value with low brightness with respect to the second threshold value, in the averaged brightness at both ends of a determining range including at least a part of the boundary.

In the configuration, since the determining unit obtains averaged brightness as a value in which brightness of a pixel group which goes along the medium width direction as the direction orthogonal to the medium transport direction is averaged along the medium transport direction from the image data, and determines whether or not there is the transport disorder based on highs and lows with respect to the first threshold value of which brightness is high, and highs and lows with respect to the second threshold value of which brightness is low, in the averaged brightness at both ends of a determining range including at least a part of the boundary, it is possible to easily recognize a state of a medium tip end.

In the medium feeding device, in a case in which the determining unit determines that there is the transport disorder, the feeding unit may be stopped.

In the configuration, in a case in which the determining unit determines that there is the transport disorder, since the feeding unit is stopped, it is possible to avoid a failure of the device which is caused when the feeding unit is operated in a state in which the transport disorder occurred.

In the medium feeding device, a feeding roller which configures the feeding unit, and is rotatably driven by a driving source, a separating roller which configures the separating unit, and is rotated in a driven manner by being in contact with the feeding roller, and a detecting unit which detects a changing amount of a position of at least any one of the feeding roller and the separating roller with respect to the other roller may be provided.

In the configuration, since the detecting unit which detects a changing amount of a position of at least any one of the feeding roller and the separating roller with respect to the other roller is provided, it is possible to detect jamming of a medium by detecting the changing amount of a position when jamming of the medium occurs, and the feeding roller or the separating roller is displaced.

In the medium feeding device, the detecting unit may include a driven roller which rotates in a driven manner by being in contact with the feeding roller or the separating roller as a target for detecting the changing amount of a position, a roller support member which rotatably supports the driven roller and can swing around a swing fulcrum, and an angle detecting sensor which detects a swing angle of the roller support member.

In the configuration, it is possible to configure the detecting unit at a low cost by making a structure thereof simple.

According to another aspect of the invention, there is provided an image reading apparatus which includes a reading unit which reads a medium, and the medium feeding device according to the aspect.

In the configuration, it is possible to obtain an operational effect described in the aspect, in the image reading apparatus.

According to a still another aspect of the invention, there is provided a recording apparatus which includes a recording unit which performs recording on a medium, and the medium feeding device according to the aspect.

In the configuration, it is possible to obtain an operational effect described in the aspect, in the recording apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
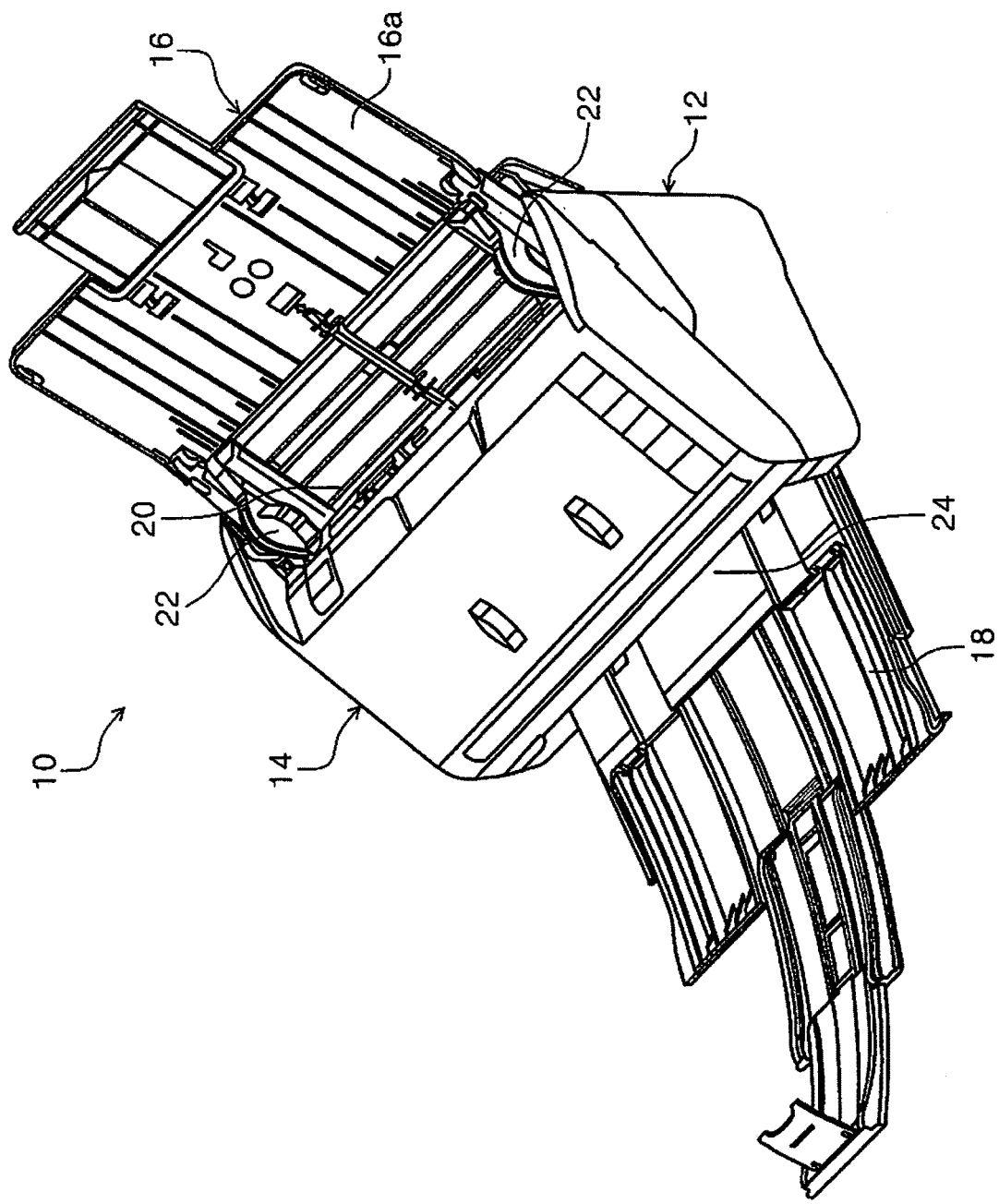
FIG. 1 is an external perspective view of a scanner in the invention.

Hereinafter, embodiments of the invention will be described based on drawings. The same configuration in each embodiment will be given the same reference numerals, descriptions will be made only for the first embodiment, and descriptions of the configuration will be omitted in embodiments thereafter.

Figure 2:
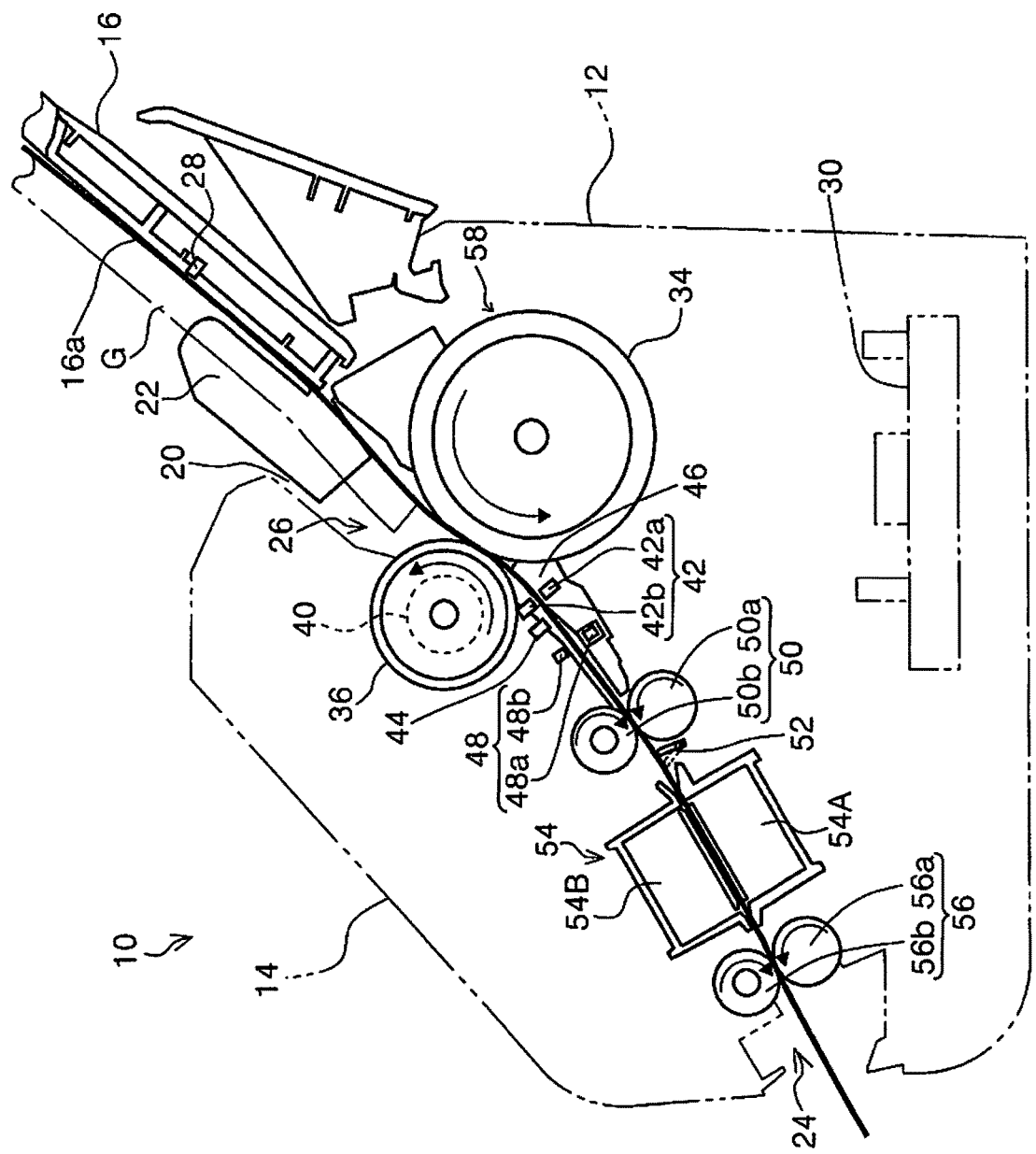
FIG. 2 is a side view which illustrates a medium transport path of the scanner in the invention.
Figure 3:
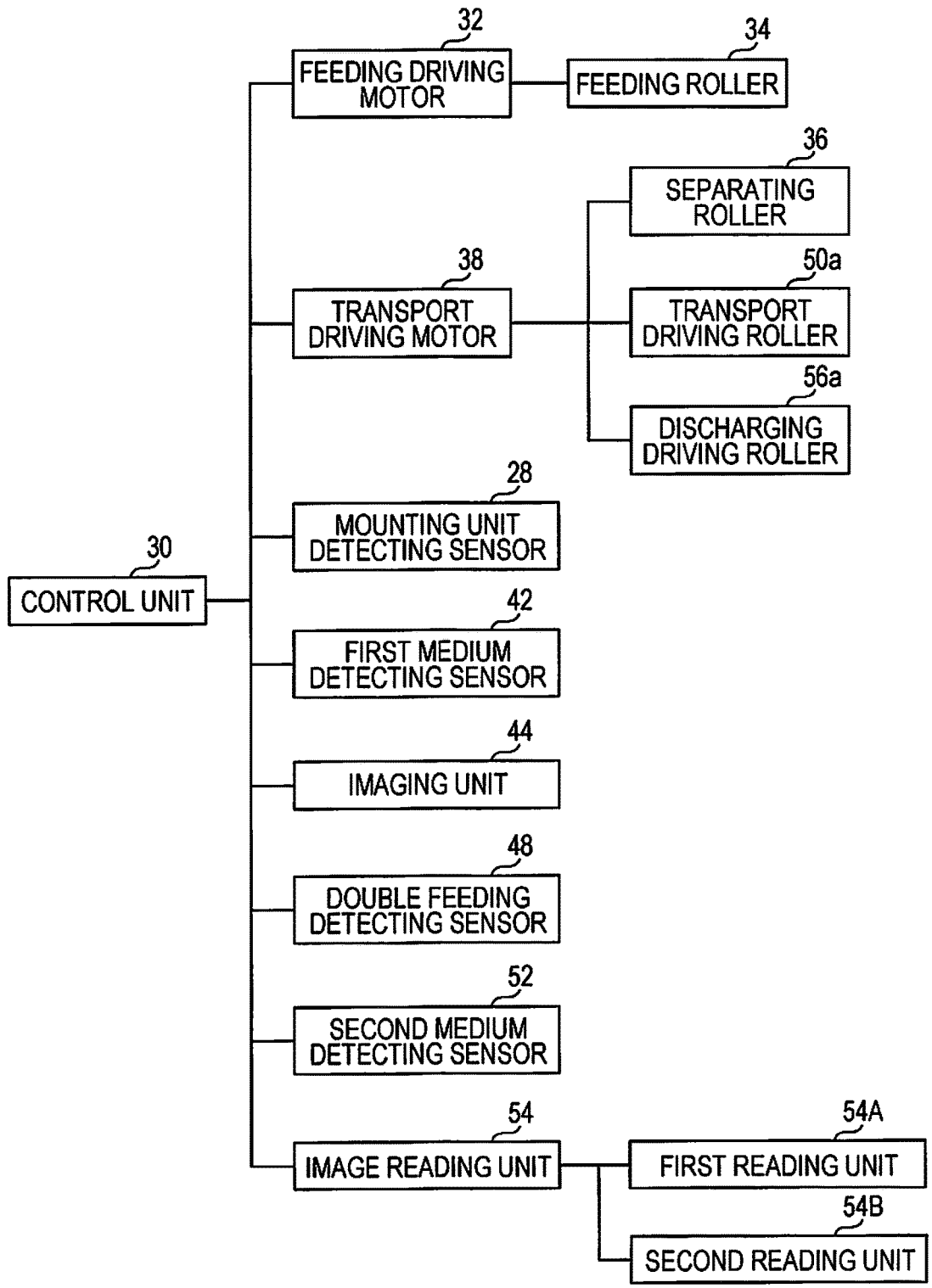
FIG. 3 is a block diagram of constituent elements which configure the scanner.
Figure 4:
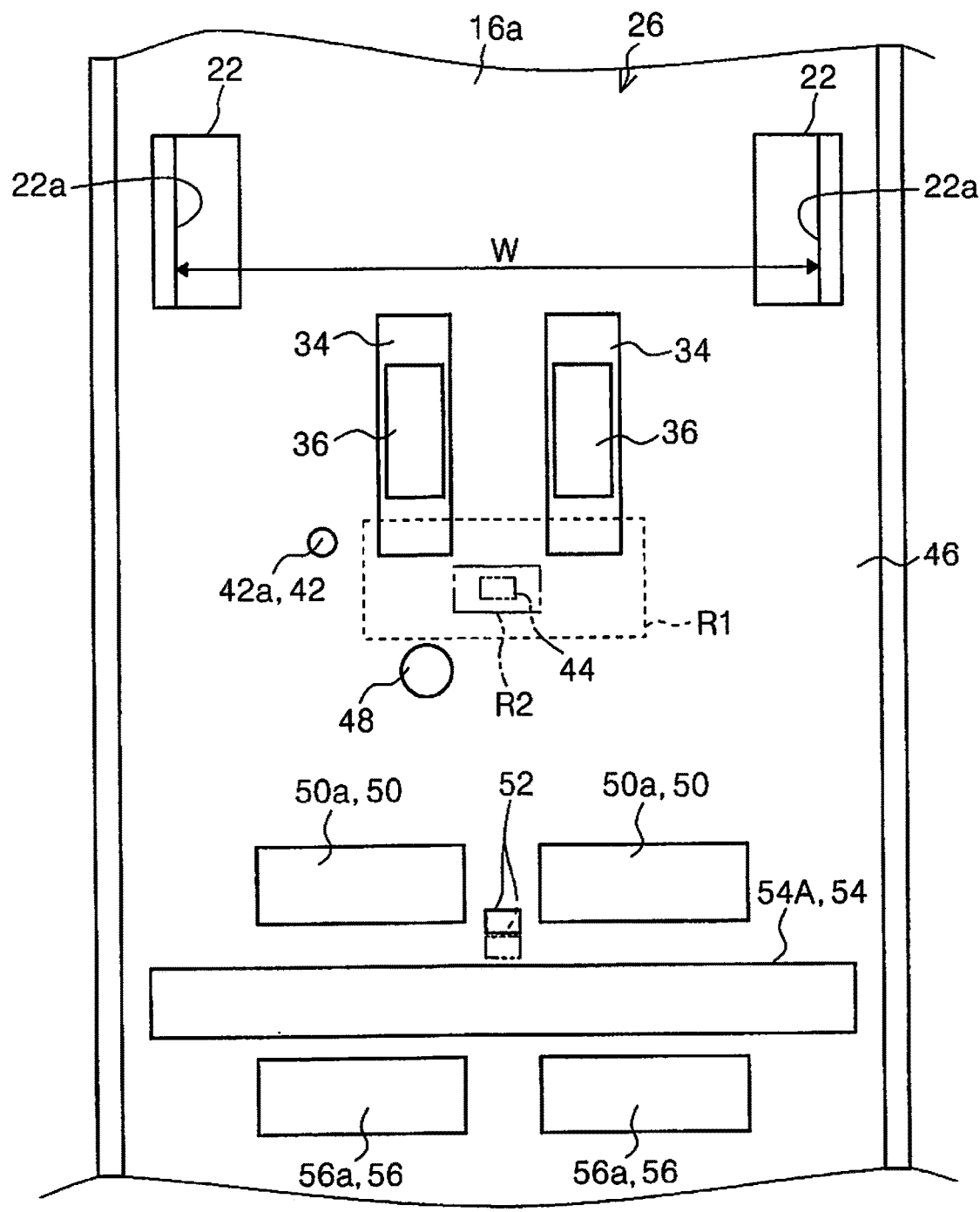
FIG. 4 is a diagram which schematically illustrates a medium transport path of the scanner according to a first embodiment.
Figure 5:
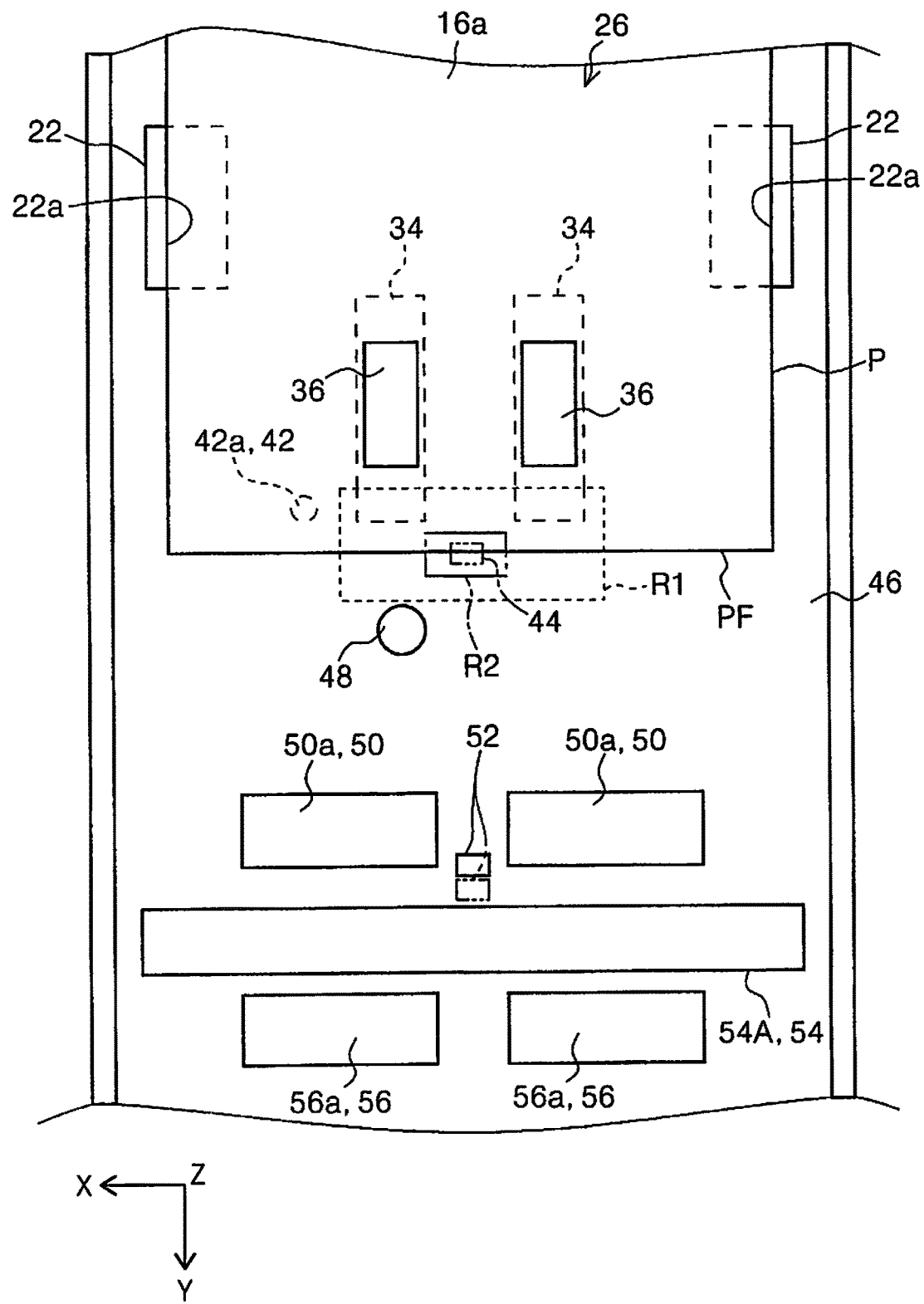
FIG. 5 is a diagram which schematically illustrates the medium transport path of the scanner according to the first embodiment, and illustrates an imaging region using an imaging unit and a determining region.

FIG. 1 is an external perspective view of a scanner in the invention, FIG. 2 is a side view which illustrates a medium transport path of the scanner in the invention, FIG. 3 is a block diagram of constituent elements which configure the scanner, FIG. 4 is a diagram which schematically illustrates the medium transport path of the scanner according to a first embodiment, and FIG. 5 is a diagram which schematically illustrates the medium transport path of the scanner according to the first embodiment, and illustrates an imaging region using an imaging unit and a determining region.

Figure 6:
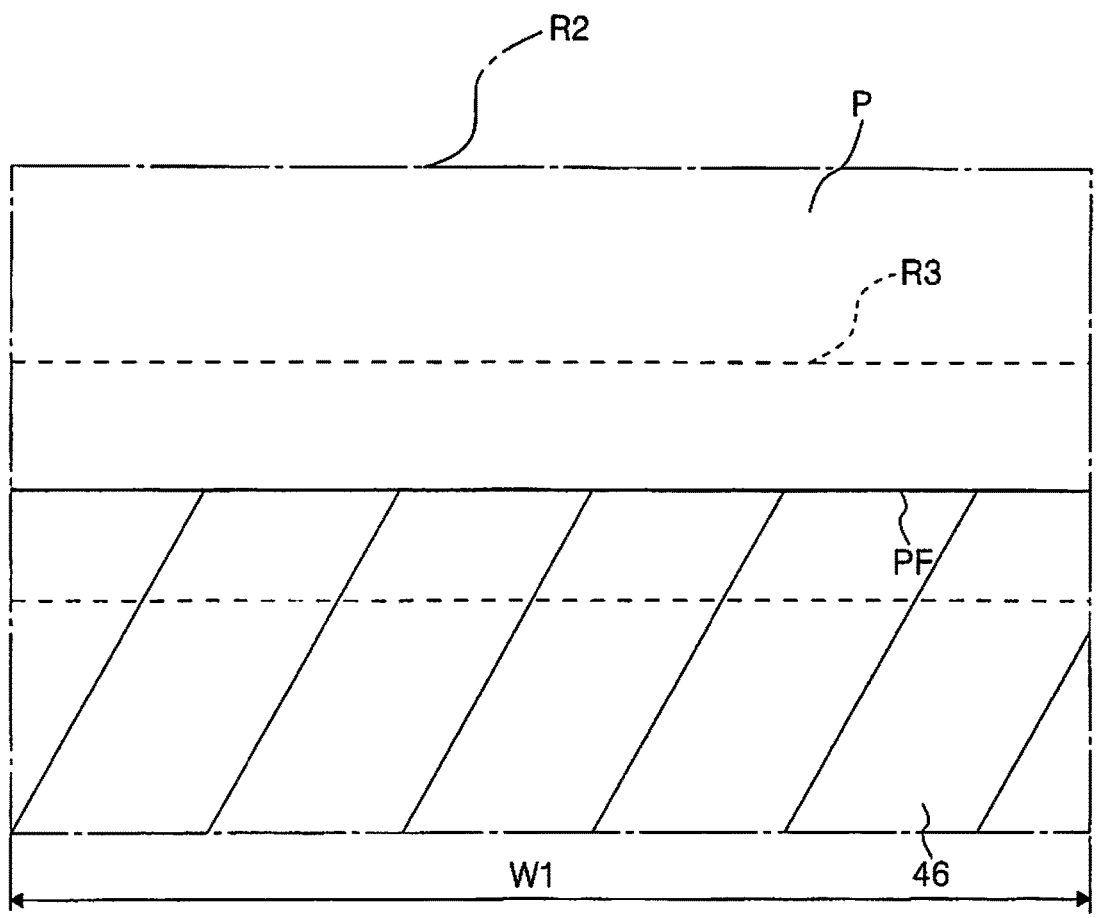
FIG. 6 is a diagram which illustrates a determining region and an edge detecting region in a normal transport state of a medium.
Figure 7:
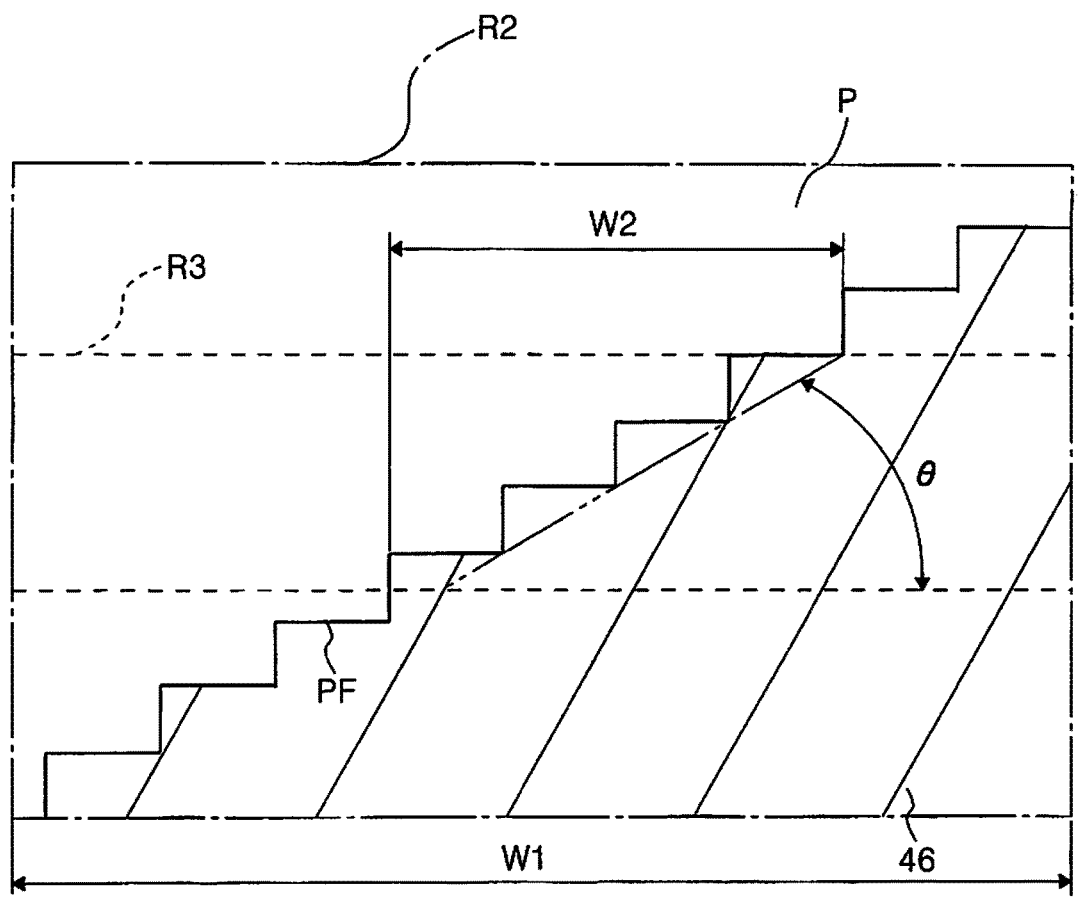
FIG. 7 is a diagram which illustrates a determining region and an edge detecting region in a skewing state of a medium.
Figure 8:
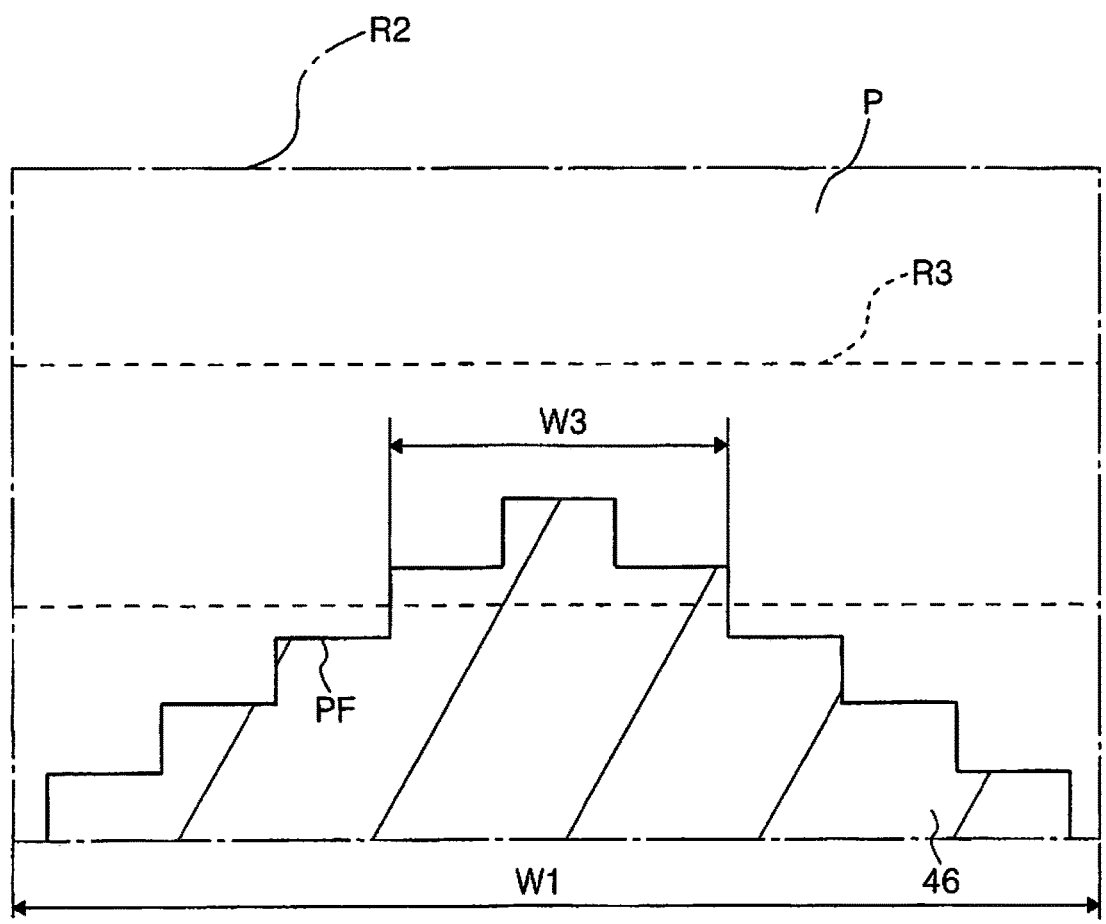
FIG. 8 is a diagram which illustrates a determining region and an edge detecting region in a jamming state of the medium.
Figure 9:
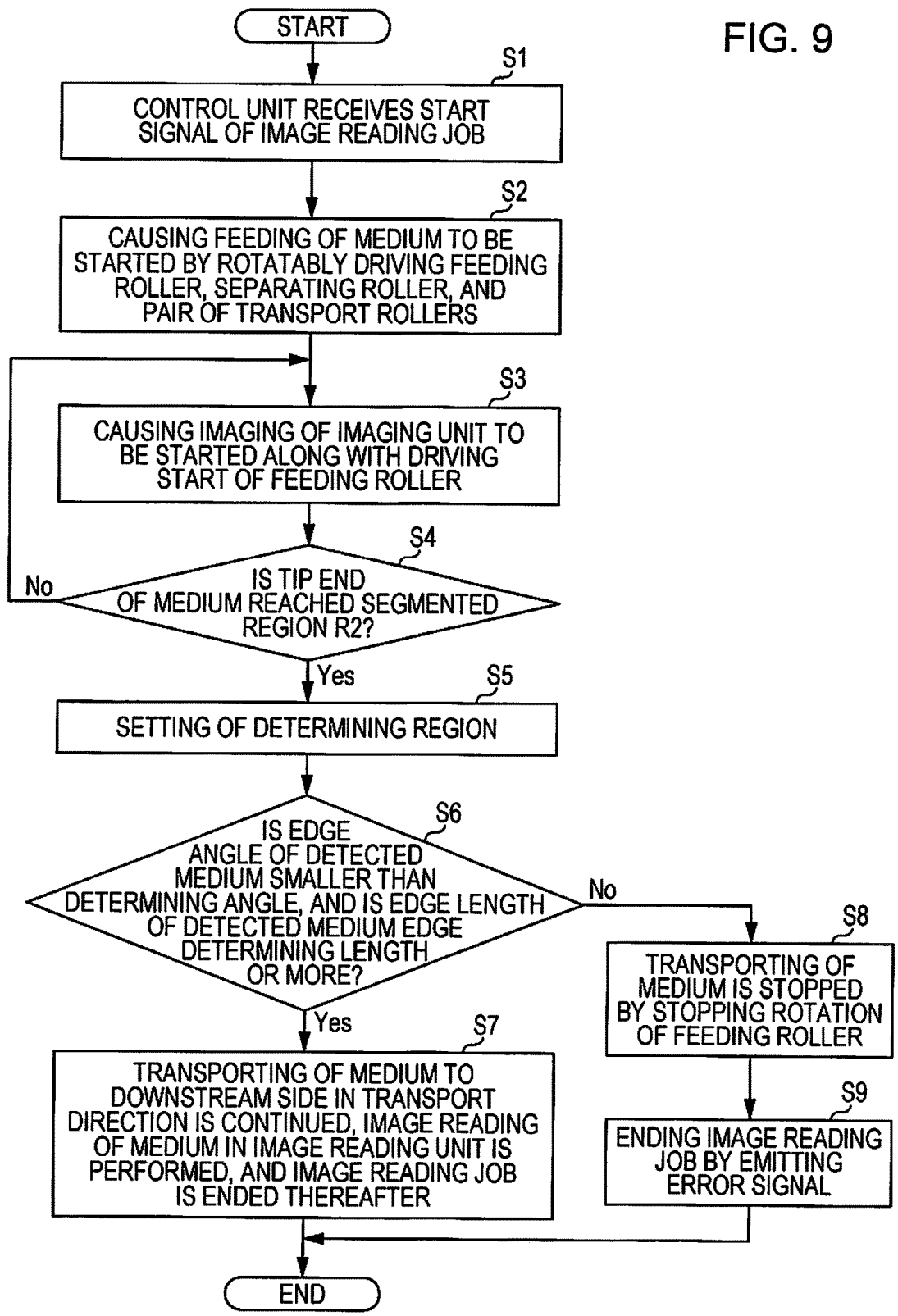
FIG. 9 is a flowchart when performing a transport control of a medium using an imaging unit according to the first embodiment.
Figure 10:
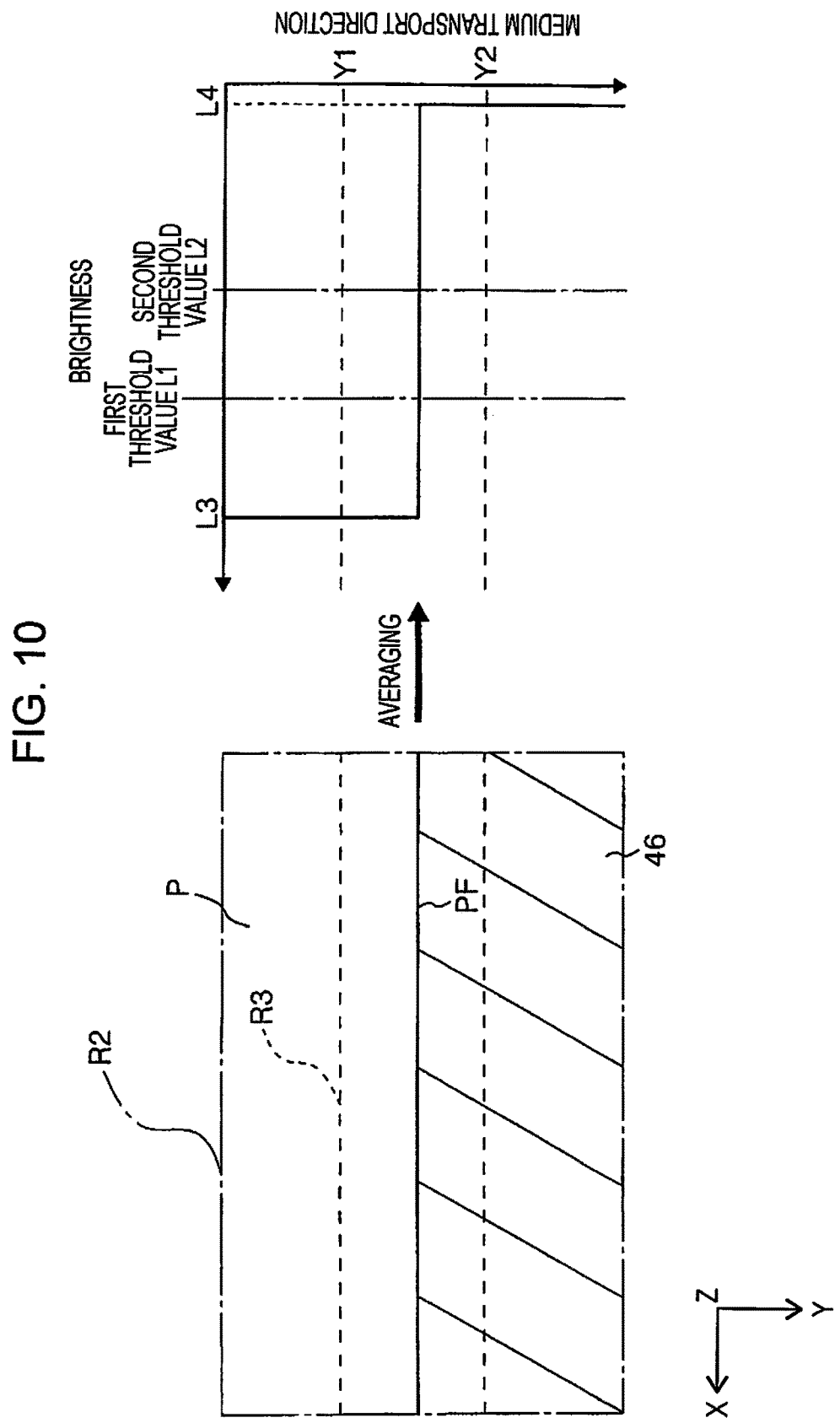
FIG. 10 is a diagram which illustrates a determining region in a normal transport state of a medium, and averaged brightness obtained from the determining region, in a second embodiment.

FIG. 6 is a diagram which illustrates a determining region and an edge detecting region in a normal transport state of a medium, FIG. 7 is a diagram which illustrates a determining region and an edge detecting region in a skewing state of a medium, FIG. 8 is a diagram which illustrates a determining region and an edge detecting region in the jammed state of the medium, FIG. 9 is a flowchart when performing a transport control of a medium using an imaging unit according to the first embodiment, and FIG. 10 is a diagram which illustrates a determining region in a normal transport state of a medium, and averaged brightness obtained from the determining region, in the second embodiment.

Figure 11:
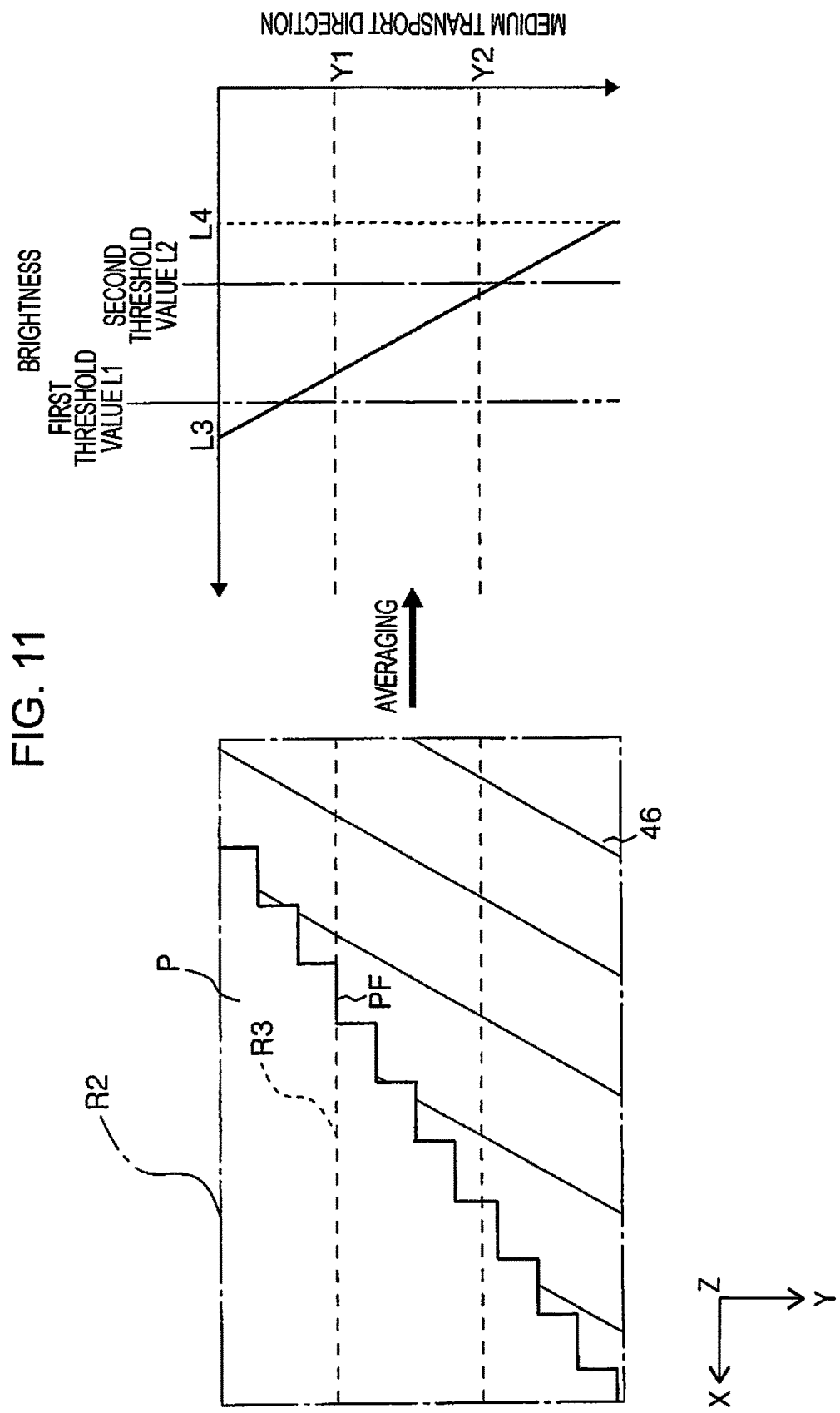
FIG. 11 is a diagram which illustrates a determining region in a skewing state of a medium, and averaged brightness obtained from the determining region in the second embodiment.
Figure 12:
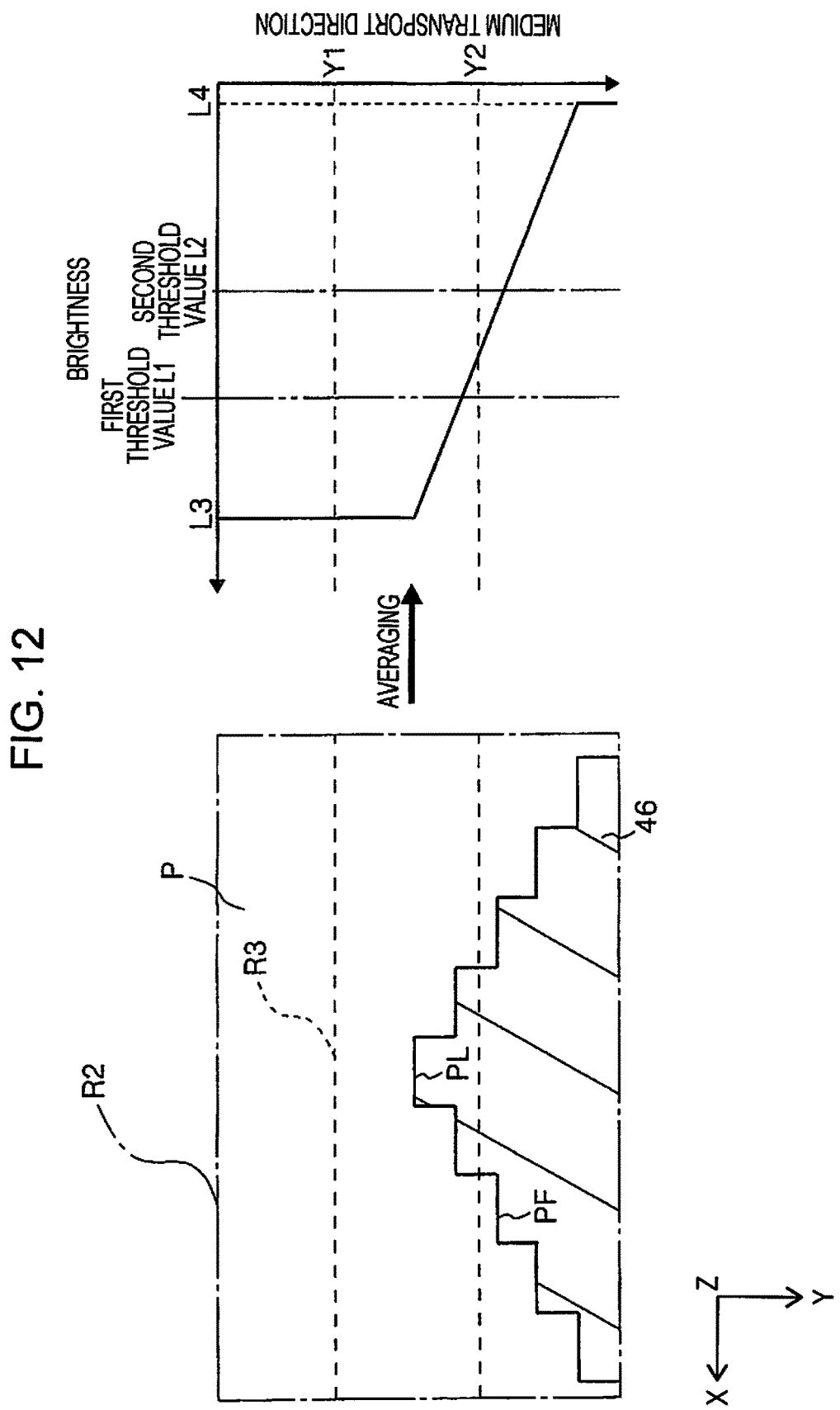
FIG. 12 is a diagram which illustrates a determining region in a jamming state of the medium, and averaged brightness obtained from the determining region in the second embodiment.
Figure 13:
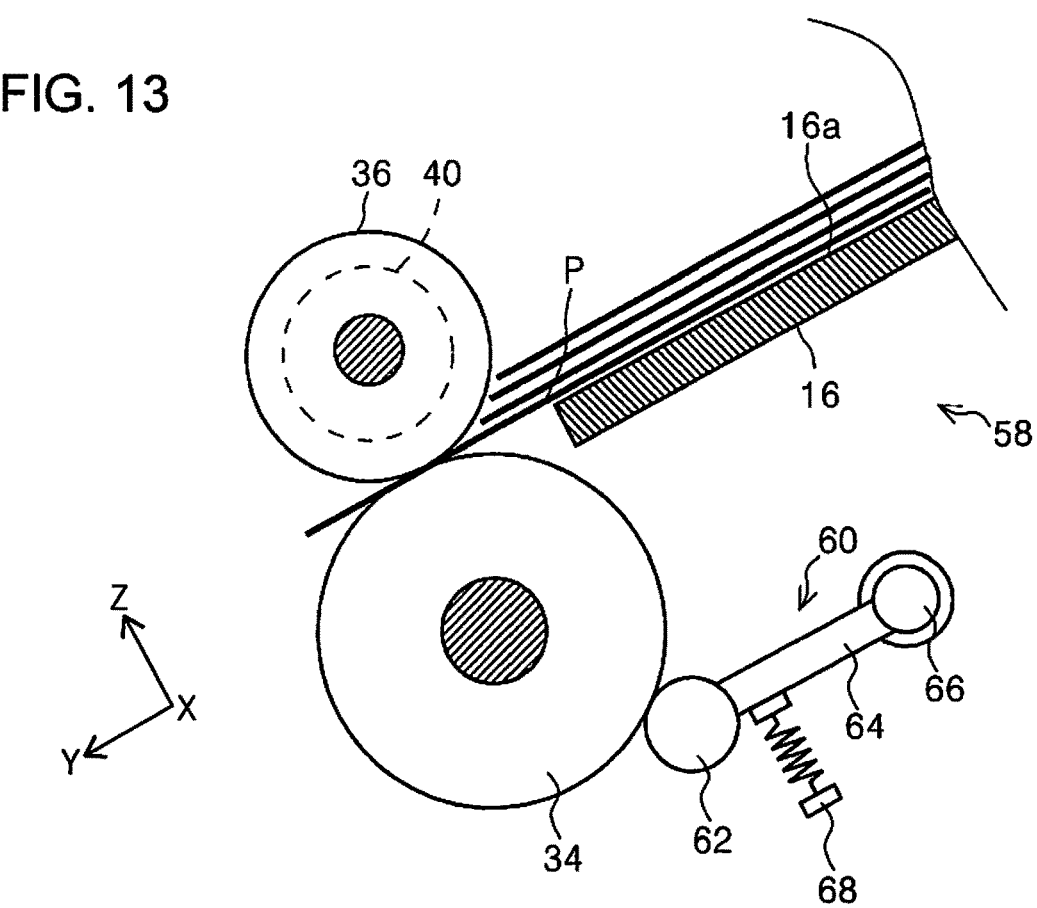
FIG. 13 is a side sectional view of a feeding roller and an angle detecting sensor according to a third embodiment.
Figure 14:
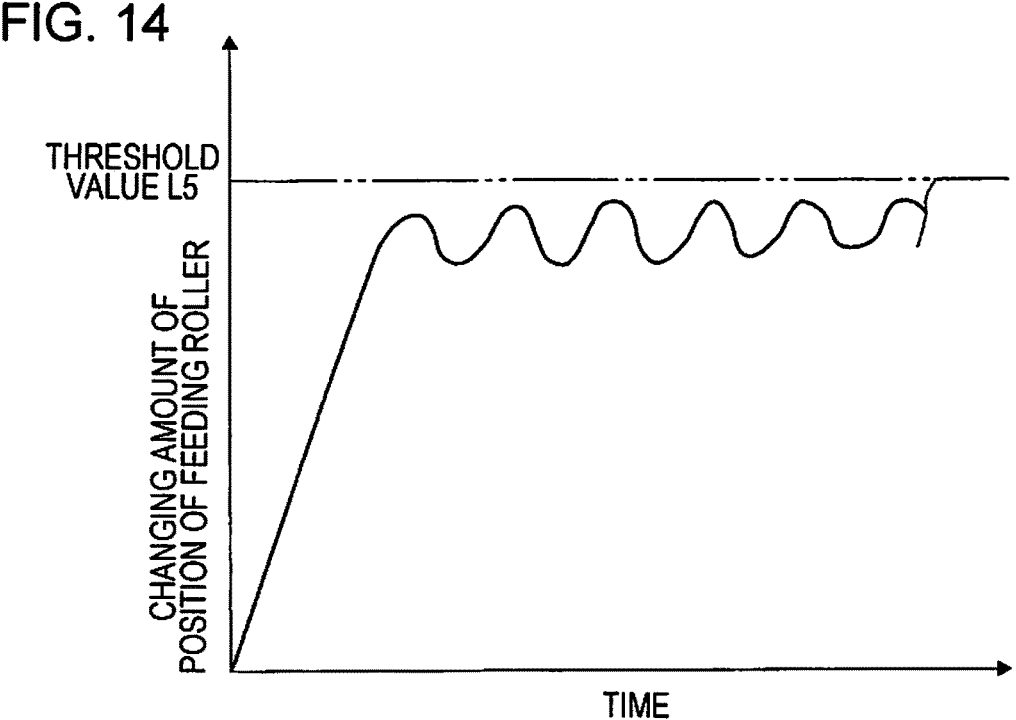
FIG. 14 is a graph which illustrates an initial changing amount in the feeding roller.

FIG. 11 is a diagram which illustrates a determining region in a skewing state of a medium, and averaged brightness obtained from the determining region in the second embodiment, FIG. 12 is a diagram which illustrates a determining region in a jammed state of the medium, and averaged brightness obtained from the determining region in the second embodiment, FIG. 13 is a side sectional view of a feeding roller and an angle detecting sensor according to a third embodiment, and FIG. 14 is a graph which illustrates an initial changing amount in the feeding roller.

Figure 15:
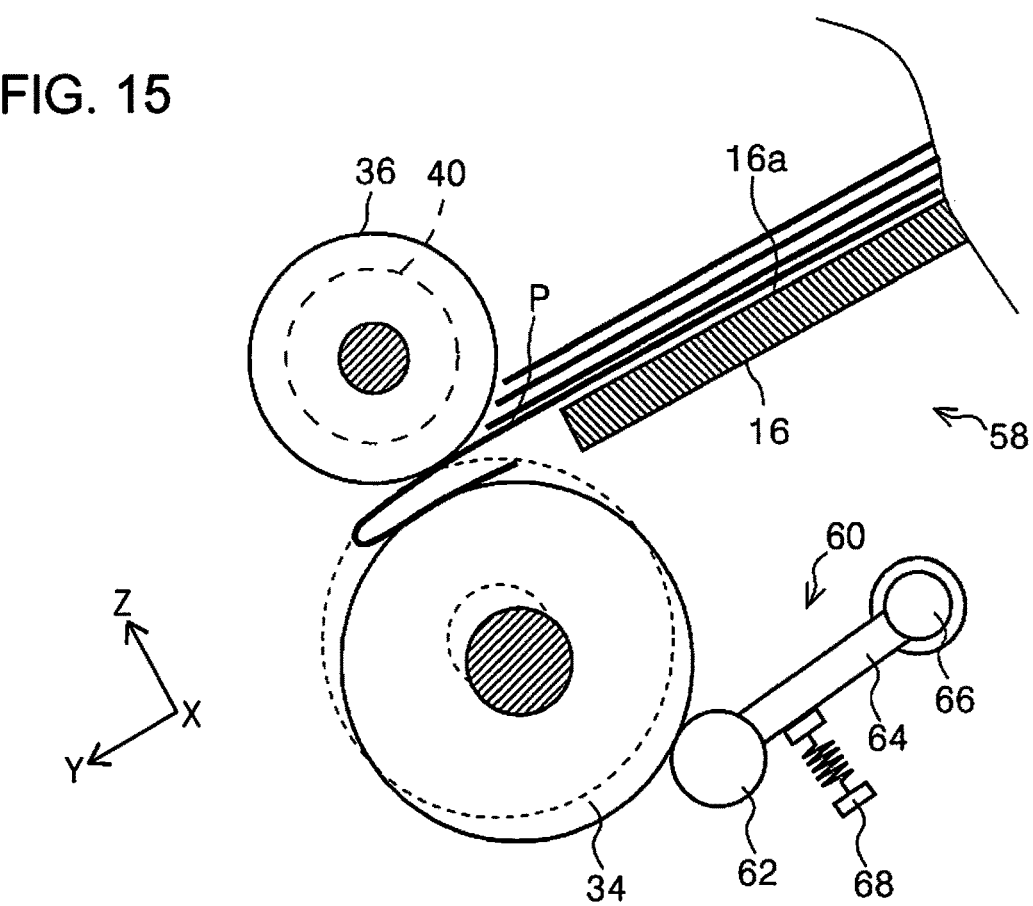
FIG. 15 is a side sectional view of the feeding roller and the angle detecting sensor in a case of an occurrence of jamming in the third embodiment.
Figure 16:
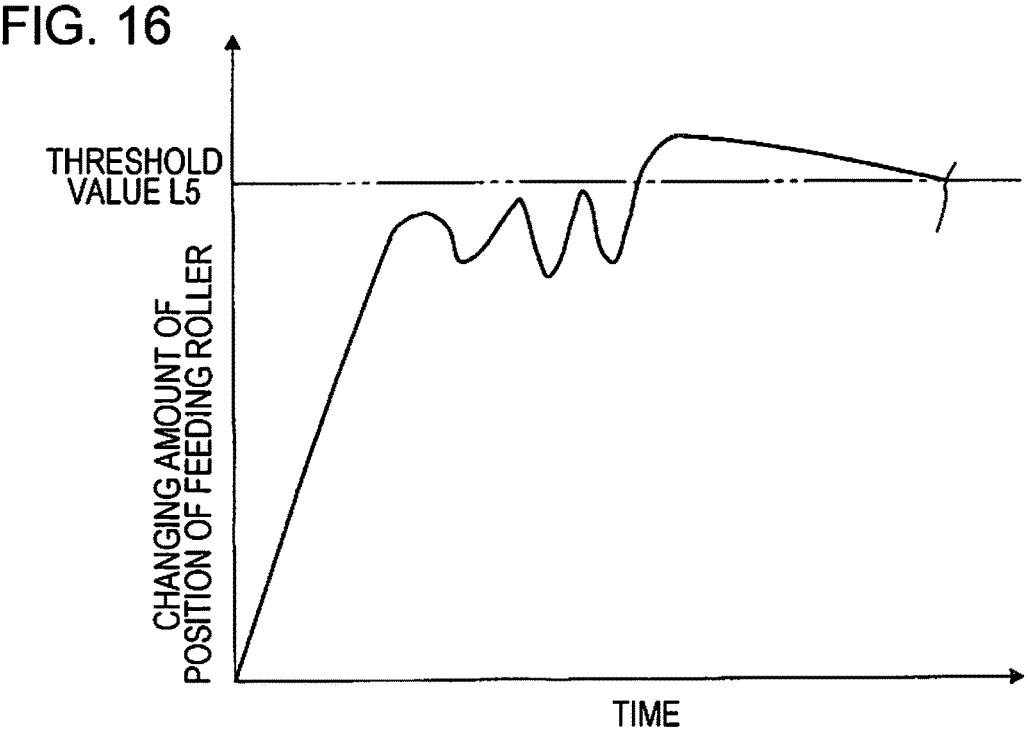
FIG. 16 is a graph which illustrates a changing amount in a case of an occurrence of jamming in the feeding roller.
Figure 17:
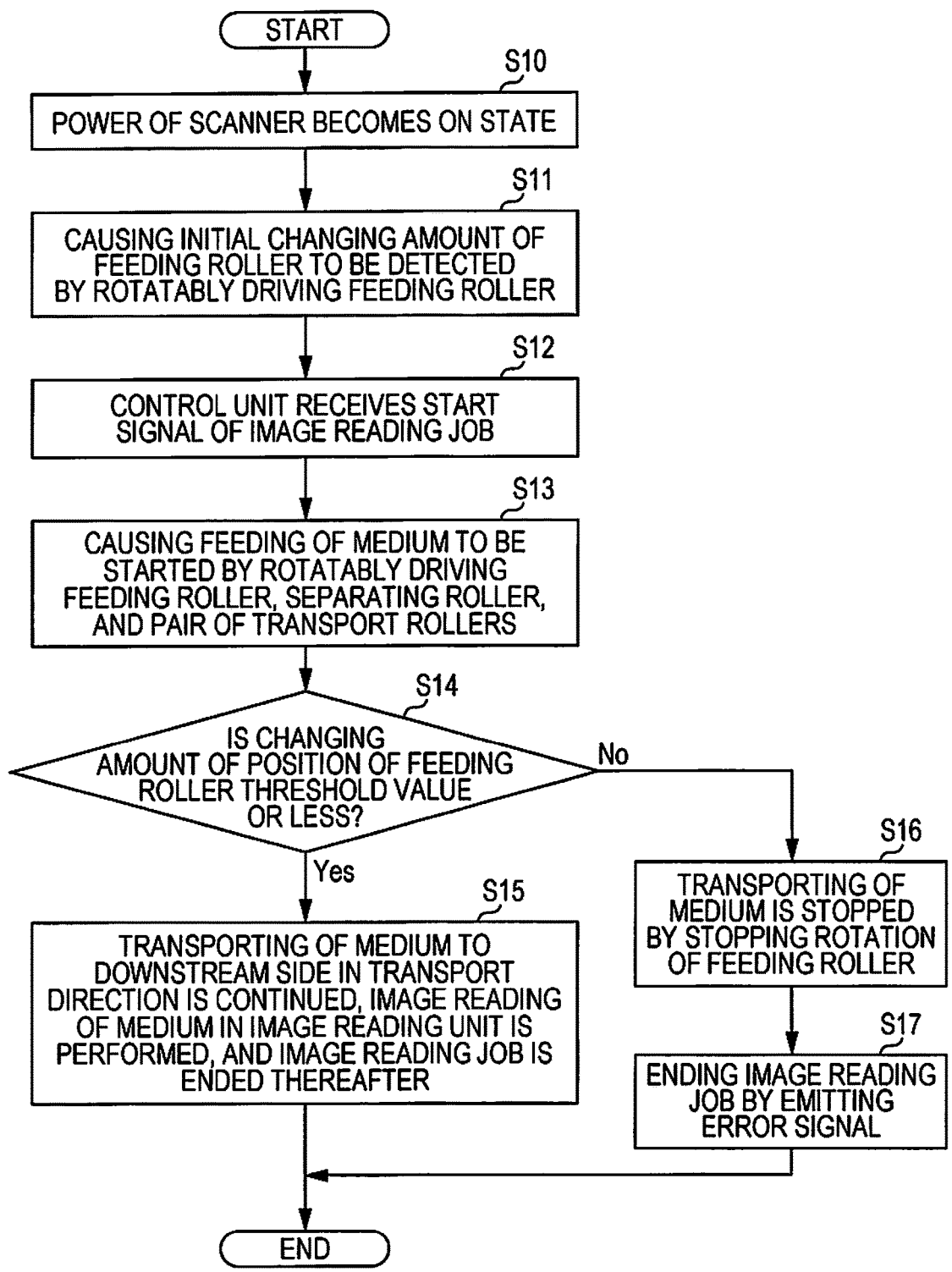
FIG. 17 is a flowchart when performing a transport control of a medium according to the third embodiment.
Figure 18:
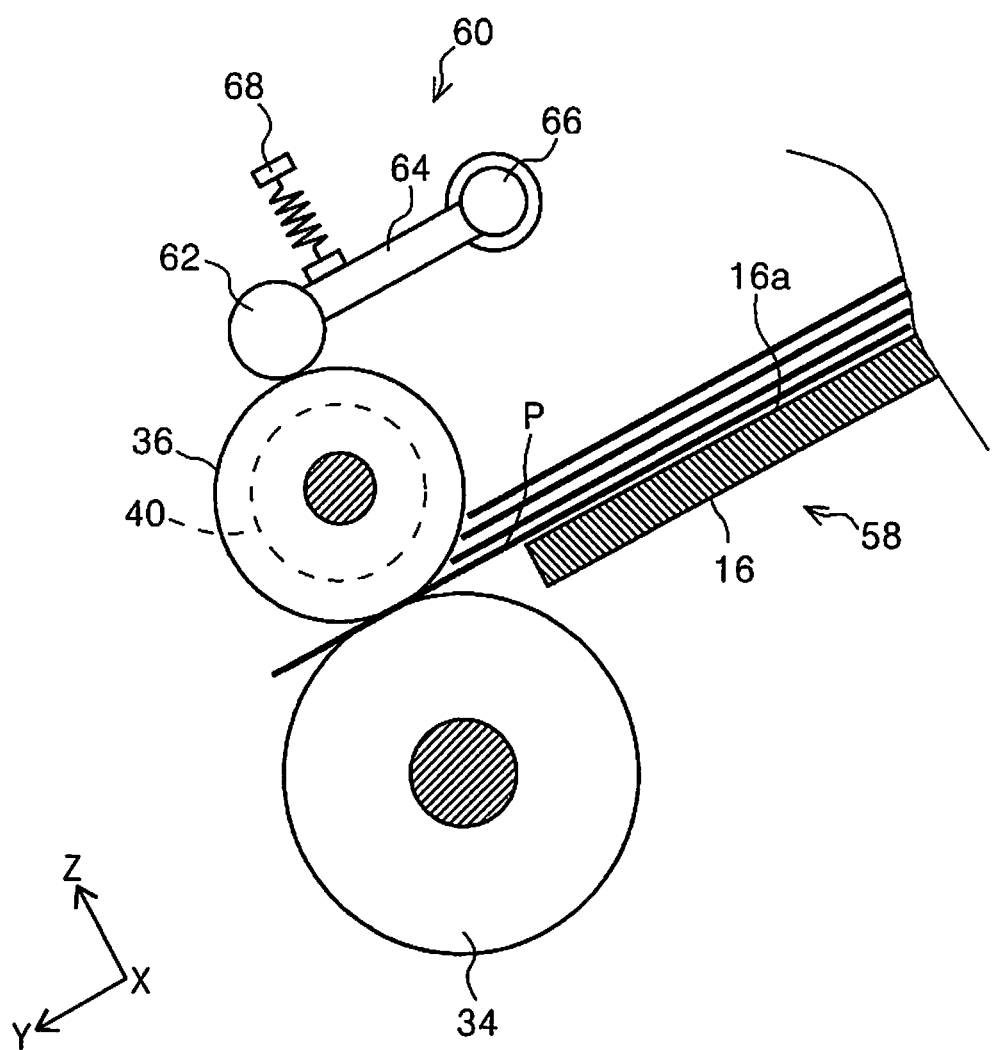
FIG. 18 is a side sectional view which illustrates one modification example of the third embodiment.
Figure 19:
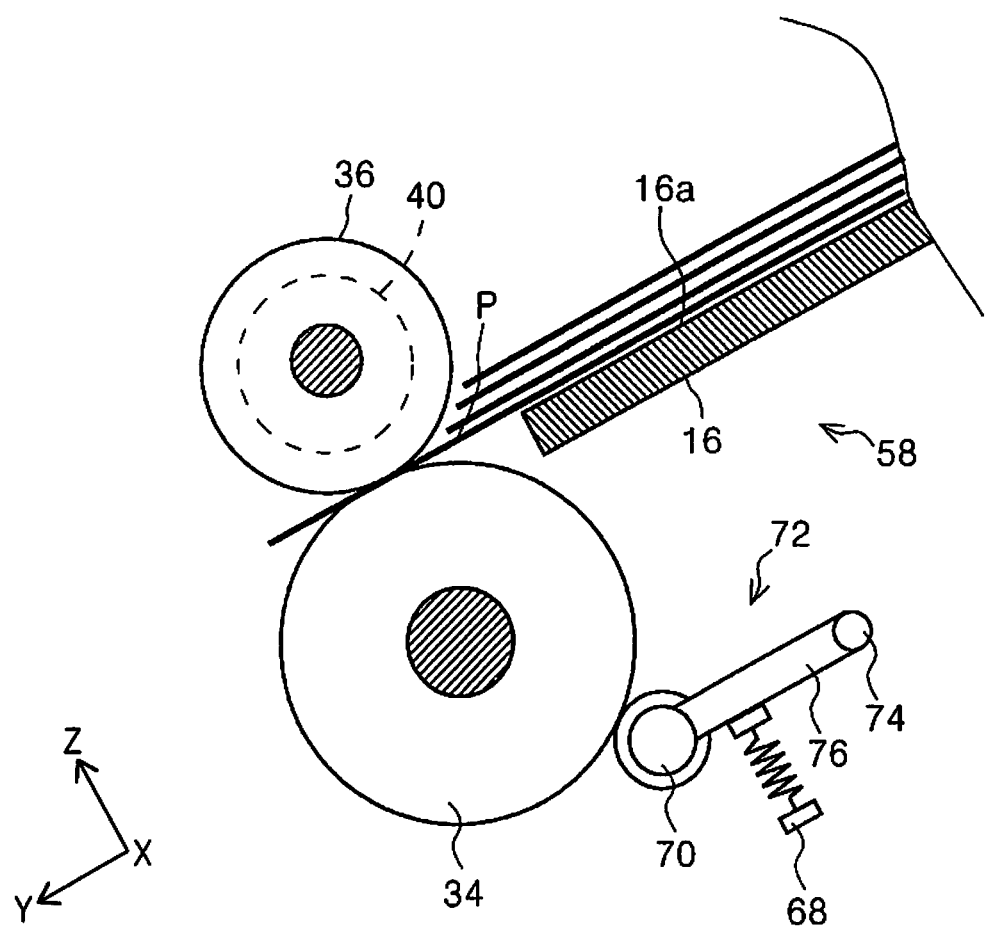
FIG. 19 is a side sectional view which illustrates another modification example of the third embodiment.

FIG. 15 is a side sectional view of the feeding roller and the angle detecting sensor in a case of an occurrence of jamming in the third embodiment, FIG. 16 is a graph which illustrates a changing amount in a case of an occurrence of jamming in the feeding roller, FIG. 17 is a flowchart when performing a transport control of a medium according to the third embodiment, FIG. 18 is a side sectional view which illustrates one modification example of the third embodiment, and FIG. 19 is a side sectional view which illustrates another modification example of the third embodiment.

In an X-Y-Z coordinate system illustrated in each figure, the X direction is a device width direction, and a sheet width direction, the Y direction is a sheet transport direction in an image reading apparatus, the Z direction is a direction orthogonal to the Y direction, and a direction appropriately orthogonal to a face of a sheet which is transport. In addition, the +Y direction side in each figure is set to the apparatus front face side, and the −Y direction side is set to the apparatus rear face side.

First Embodiment

The embodiment has a basic concept in which a tip end of a medium transported by an imaging unit provided in the medium transport path of the scanner 10 as the "image reading apparatus" is imaged, a transport state of the medium is determined by evaluating a state of a boundary between a path member of the medium transport path and the tip end of the medium, from the obtained image data, and a necessary transport control is performed.

Regarding Image Reading Apparatus

When referring to FIGS. 1 and 2, the scanner 10 is provided with a lower unit 12, a higher unit 14, a cover portion 16, and a discharging tray 18. In the embodiment, though it is not illustrated, the higher unit 14 is rotatably attached to the lower unit 12 by setting the downstream side in a sheet transport direction to a rotation fulcrum.

The cover portion 16 is rotatably attached to the lower unit 12 on a higher part of the rear face side of the lower unit 12. The cover portion 16 can obtain a non-feeding state (not illustrated) which covers a higher part of the higher unit 14 and a feeding port 20, and a feeding state of rotating to the apparatus rear face side, as illustrated in FIG. 1, and opening the feeding port 20. In addition, the rear face of the cover portion 16 functions as a medium mounting portion 16a on which the medium P is mounted in the feeding state as illustrated in FIG. 1.

A discharging port 24 from which a medium P is discharged is provided on the apparatus front face side of the lower unit 12. In addition, the lower unit 12 is provided with a discharging tray 18 which can be pulled out from the discharging port 24 toward the apparatus front face side. The discharging tray 18 can obtain a state of being received in a base portion of the lower unit 12 (not illustrated), and a state of being pulled out to the apparatus front face side (refer to FIG. 1). The discharging tray 18 is configured of a plurality of tray members which are connected, in the embodiment, and a length to be pulled out from the discharging port 24 can be adjusted according to a length of the medium P which is discharged.

Regarding Medium Transport Path in Scanner

Subsequently, a medium transport path 26 in the scanner 10 will be described with reference to FIGS. 2 to 4. In FIG. 2, in the lower unit 12 and the higher unit 14, only exteriors of housings thereof are denoted by a virtual line. A thick solid line attached with a mark P in FIG. 2 denotes a guiding path of a medium transported along a medium transport path 26 in the scanner 10.

In the embodiment, the medium P which is set in the feeding port 20 is supported by the rear face of the cover portion 16 in a posture of being rotated on the apparatus rear face side with respect to the lower unit 12, that is, supported by the medium mounting portion 16a, and is mounted thereon. A plurality of the medium P can be set in the feeding port 20. A mounting unit detecting sensor 28 is provided in the medium mounting portion 16a. The mounting unit detecting sensor 28 is configured as a contact sensor including a lever, or the like, or an optical sensor, as an example, and transmits a detecting signal to a control unit 30, which will be described later, when the medium P is set on the medium mounting portion 16a. In addition, it is possible to set the plurality of mediums P on the medium mounting portion 16a.

In the embodiment, a pair of edge guides 22 are provided in the medium mounting portion 16a, as illustrated in FIG. 4. The edge guides 22 are configured so as to move in a direction of being close to each other or a direction of being separated from each other in the device width direction in FIG. 4. In addition, when the medium P is set in the medium mounting portion 16a, a guide face 22a of the edge guide 22 comes into contact with a side portion of the medium P in the device width direction, moves the edge guide 22 to a position of regulating a position of the medium P in the device width direction, and holds the side portion of the medium P. In this manner, the edge guide 22 guides feeding of the medium P. The edge guides 22 in FIG. 4 show a state of being farthest from each other in the device width direction, that is, in the width direction of the medium P.

Here, a medium transport region W is set as a region between guide faces 22a of the pair of edge guides 22 in a state of being farthest from each other in the device width direction, when referring to FIG. 4. Specifically, the medium transport region W is set to a width of the medium P with a maximum size which can be fed in the scanner 10.

In the medium P mounted on the medium mounting portion 16a, a medium P mounted on the lowest portion is fed to the downstream side in the feeding direction using a feeding roller 34 as a "feeding unit" which is rotatably driven by a feeding driving motor 32 (refer to FIG. 3). As illustrated in FIG. 4, two feeding rollers 34 are provided with an interval in the device width direction, as an example. The outer peripheral face of the feeding roller 34 is configured of a high friction material (for example, elastomer such as rubber, or the like).

A mark G in FIG. 2 denotes a bunch of medium P mounted (set) on the medium mounting portion 16a. A tip end of the bunch of medium G is held at a feeding standby position (position in FIG. 2) using a stopper (not illustrated), before a start of feeding, and entering between the feeding roller 34 and a separating roller 36 which will be described later is regulated.

As illustrated in FIG. 2, the separating roller 36 as a "separating unit" is provided at a position of facing the feeding roller 34. As illustrated in FIG. 4, two separating rollers 36 are provided at positions corresponding to the feeding roller 34 in the device width direction. The separating rollers 36 are provided in a state of being urged with respect to the feeding roller 34 using an urging unit (not illustrated). In addition, the separating roller 36 is rotatably driven in a direction opposite (counterclockwise direction in FIG. 2) to a rotation direction of the feeding roller 34 (counterclockwise direction in FIG. 2, that is, direction of sending medium to downstream side) using a transport driving motor 38 (refer to FIG. 3). The outer peripheral face of the separating roller 36 in the embodiment is configured of the high friction material (for example, elastomer such as rubber, or the like), similarly to the feeding roller 34.

In addition, in the embodiment, a torque limiter 40 is provided in the separating roller 36. The separating roller 36 is configured so as to receive a driving torque of the transport driving motor 38 through the torque limiter 40.

Here, when rotation torque received from the feeding roller 34 exceeds limit torque of the torque limiter 40, the separating roller 36 is separated from a driving system of the transport driving motor 38 using the torque limiter 40, and rotates in accordance with the feeding roller 34 (clockwise direction in FIG. 2).

When feeding of the medium P is started, and the plurality of mediums P enter between the feeding roller 34 and the separating roller 36, the separating roller 36 is not able to receive rotation torque from the feeding roller 34, and the rotation performed in accordance with the feeding roller 34 stops. In addition, the separating roller 36 starts rotating in the direction opposite to the feeding roller 34 (counterclockwise direction in FIG. 2) by receiving a driving force of the transport driving motor 38 through the torque limiter 40. In this manner, mediums P on the top (medium P to be prevented from double feeding) except for the lowest medium P to be fed does not receive a transport force for proceeding to the downstream side, and returns to the upstream side in the transport direction due to the rotation of the separating roller 36. In this manner, double feeding of the medium P is prevented. In addition, the lowest medium P to be fed proceeds to the downstream side due to a transport force which is received from the feeding roller 34, since the medium P is in direct contact with the feeding roller 34.

Subsequently, in the medium transport path 26, a first medium detecting sensor 42 which detects feeding of the medium P is provided on the downstream side of the feeding roller 34 and the separating roller 36. In addition, as illustrated in FIG. 4, the first medium detecting sensor 42 is disposed in the transport region W of the medium P with a maximum size which can be fed, in the device width direction of the medium transport path 26, as an example. The first medium detecting sensor 42 is provided with a light emitting portion 42a and a light receiving portion 42b. The light emitting portion 42a and the light receiving portion 42b are disposed at positions facing each other by interposing the medium transport path 26 therebetween. In addition, it is configured so that the medium P is detected when the medium P blocks off detecting light from the light emitting portion 42a, at a time of transporting the medium P to the medium transport path 26. In addition, when detecting the medium P, the first medium detecting sensor 42 transmits a detecting signal to the control unit 30.

An imaging unit 44 is provided on the downstream side of the feeding roller 34 and the separating roller 36. As an example, the imaging unit 44 is provided at the higher unit 14 side and a center portion in the device width direction in the medium transport path 26, and is disposed so as to image the path member 46 on the lower unit 12 side which forms a part of the medium transport path 26, more specifically, the center portion in the device width direction of the medium transport path 26.

The imaging unit 44 starts imaging of the medium transport path 26 when driving of the feeding roller 34 is started. In addition, the imaging unit 44 sends the imaged image data to the control unit 30 as the "determining unit". In addition, the imaging unit 44 in the embodiment is an area sensor in which an imaging element such as a CCD or a CMOS, as an example, is disposed in a planar shape.

When referring to FIG. 2 again, a double feeding detecting sensor 48 which detects double feeding of the medium P is disposed on the downstream side of the first medium detecting sensor 42 and the imaging unit 44 in the transport direction, in the medium transport path 26. In addition, as illustrated in FIG. 4, the double feeding detecting sensor 48 is disposed in the medium transport region W in the device width direction. In the embodiment, the double feeding detecting sensor 48 is configured as an ultrasonic sensor which is provided with a speaker portion 48a and a microphone portion 48b. In addition, the double feeding detecting sensor 48 is configured so as to oscillate ultrasonic wave toward the medium P from the speaker portion 48a through the medium transport path 26, and detects a reflected sound from the medium P in the microphone portion 48b. In the embodiment, the double feeding detecting sensor 48 is configured so as to also detect a type of paper such as thick paper, not only double feeding of the medium P using a frequency of the reflected sound.

A pair of transport rollers 50 is provided on the downstream side of the double feeding detecting sensor 48 in the transport direction in the medium transport path 26. In addition, as illustrated in FIG. 4, two pair of transport rollers 50 (transport driving rollers 50a) are provided in the device width direction with an interval. In addition, the pair of transport rollers 50 is provided with a transport driving roller 50a, and a transport driven roller 50b which rotates in a driven manner with respect to the transport driving roller 50a. In the embodiment, the transport driving roller 50a is rotatably driven, using the transport driving motor 38.

A second medium detecting sensor 52 is provided on the downstream side of the pair of transport rollers 50 in the transport direction, in the medium transport path 26. The second medium detecting sensor 52 is configured as a contact sensor including a lever, as an example. In addition, when the medium P is transported along the medium transport path 26, the lever of the second medium detecting sensor 52 rotates on the downstream side in the transport direction, by being pressed by a tip end of the medium P (refer to two-dot dashed line in FIGS. 2 and 4). In this manner, the second medium detecting sensor 52 detects the medium P. In addition, the second medium detecting sensor 52 transmits a detecting signal to the control unit 30 when the medium P is detected.

An image reading unit 54 as the "reading unit" is provided on the downstream side of the second medium detecting sensor 52. Here, the image reading unit 54 is provided with a first reading unit 54A which is provided in the lower unit 12 so as to face the lower face of the medium P which is transported along the medium transport path 26, that is, a first face, and a second reading unit 54B which is provided in the higher unit 14 so as to face a top face of the medium P transported along the medium transport path 26, that is, a second face. In the embodiment, the first reading unit 54A and the second reading unit 54B are configured as a "reading unit", and is configured as a contact type image sensor module (CISM), as an example.

The medium P is discharged from a discharging port 24 by being nipped by a pair of discharging rollers 56 which is located on the downstream side of the image reading unit 54 in the transport direction, after an image on at least one face of the first face and the second face of the medium P is read in the image reading unit 54.

In the embodiment, the pair of discharging rollers 56 is provided with a discharging driving roller 56a, and a discharging driven roller 56b which rotates in a driven manner with respect to the discharging driving roller 56a. In the embodiment, the discharging driving roller 56a is rotatably driven by the transport driving motor 38. In addition, the transport driving roller 50a and the discharging driving roller 56a are configured so as to be rotatably driven by the transport driving motor 38 as a common driving source; however, it may be a configuration in which the transport driving roller and the discharging driving roller are rotatably driven, individually, using an individual driving source.

The control unit 30 (refer to FIG. 2) is provided inside the lower unit 12. The control unit 30 in the embodiment is configured as an electric circuit provided with a plurality of electronic components. The control unit 30 controls a feeding driving motor 32 which rotatably drives the first reading unit 54A, the second reading unit 54B, and the feeding roller 34 by receiving detecting signals of the mounting unit detecting sensor 28, the first medium detecting sensor 42, the double feeding detecting sensor 48, and the second medium detecting sensor 52, and the transport driving motor 38 which rotatably drives the transport driving roller 50a and the discharging driving roller 56a. In addition, the control unit 30 controls the imaging unit 44 to start imaging along with a start of driving of the sheet feeding roller 34.

The control unit 30 as an example is configured so as to control transporting of the medium P, and an image reading operation in the scanner 10. In addition, the control unit 30 may control operations which are necessary at a time of executing a medium reading operation in the scanner 10, based on an instruction from the outside (PC, or the like).

In the embodiment, as an example, the medium mounting portion 16a, the feeding roller 34, the separating roller 36, the imaging unit 44, and the control unit 30 configure a medium feeding device 58.

Regarding Transport Control of Medium Using Imaging Unit

Subsequently, a transport control of the medium P using the imaging unit 44 will be described with reference to FIGS. 4 to 9. First, when referring to FIGS. 4 and 5, the imaging unit 44 is configured so as to image the medium transport path 26, and a part of the path member 46 of the lower unit 12 from the higher unit 14 side. Specifically, the imaging unit 44 is configured so as to image the inside of an imaging region R1 which is surrounded with a dashed line. According to the embodiment, a rectangular segmented region R2 (refer to one-dot dashed line) which determines a boundary between a tip end portion PF of the medium P and the path member 46 is provided in the imaging region R1. In addition, the hatched portion in FIGS. 6 to 8 denotes a region of the path member 46 which is imaged.

As illustrated in FIG. 5, the medium P is fed by the feeding roller 34 from the medium mounting portion 16a to a position which gets out of a nipping point between the feeding roller 34 and the separating roller 36 in the medium transport path 26. In this manner, the tip end portion PF of the medium P reaches the inside of the imaging region R1 of the imaging unit 44, and the inside of a segmented region R2. In addition, the imaging unit 44 transmits image data in a state in which the tip end portion PF of the medium P reached the inside of the segmented region R2 to the control unit 30.

Hereinafter, a transport control in a case in which the medium P is normally transported, and a case in which there is transport disorder will be further described with reference to FIGS. 6 to 9. As illustrated in FIG. 9, the control unit 30 receives a start signal of an image reading job as step S1. In addition, the control unit 30 causes the feeding roller 34, the separating roller 36, and the transport driving roller 50a to start feeding of the medium P by rotatably driving thereof as step S2. In addition, the control unit 30 starts imaging using the imaging unit 44 along with a start of driving of the feeding roller 34 as step S3.

Here, when the medium P is transported to the downstream side in the transport direction in a normal state by passing through the nipping point between the feeding roller 34 and the separating roller 36, the tip end portion PF of the medium P reaches the segmented region R2 in the imaging region R1, as illustrated in FIG. 6.

The control unit 30 determines whether or not the tip end portion PF of the medium P reaches the segmented region R2 based on the image data transmitted from the imaging unit 44, as step S4.

Whether or not the tip end portion PF of the medium P reached the segmented region R2 may be determined based on whether or not a predetermined time has passed after starting of driving of the feeding roller 34, for example, may be determined based on a detection of the tip end portion PF using the first medium detecting sensor 42, or may be determined based on a change in image data transmitted from the imaging unit 44.

In addition, the control unit 30 sets the segmented region R2 which is illustrated in FIGS. 6 to 8, as step S5. The segmented region R2 is a region with a predetermined width in the sheet transport direction, and is a region in which a center portion of the tip end portion PF in the sheet width direction is included, as an example. The control unit 30 evaluates a state of the tip end portion PF in the segmented region R2.

More specifically, in the embodiment, light is radiated to the imaging region R1 using a light source (not illustrated), in order to make an image in the in the segmented region R2 preferable. In addition, reflected light of the imaging region R1 in a state in which the tip end portion PF of the medium P is located in the segmented region R2 is received by an imaging element of the imaging unit 44, and the control unit 30 performs predetermined processing with respect to the image data in the segmented region R2 in the imaging region R1 which is obtained by the imaging unit 44.

More specifically, a detecting intensity of the imaging element which receives reflected light from the medium P becomes stronger than a detecting intensity of an imaging element which receives reflected light from the path member 46, and of which brightness is high. That is, in image data imaged by the imaging unit 44, brightness of a portion corresponding to the medium P is high, and brightness of a portion corresponding to the path member 46 is low. The control unit 30 can clearly determine a boundary between the tip end portion PF of the medium P and the path member 46 in the image data in the segmented region R2 which is illustrated in FIG. 6, that is, the edge.

In addition, in a case in which the tip end portion PF of the medium P is detected in the segmented region R2, the control unit 30 sets a determining region R3, as described above, as step S5, and determines whether or not an edge angle of the tip end portion PF is smaller than a determining angle in the determining region R3, and whether or not a length of the edge of the tip end portion PF is a determining length or more (step S6).

First, determining of the edge angle of the tip end portion PF will be described. The control unit 30 determines whether or not an inclined angle of the edge (edge angle: angle θ in FIG. 7) with respect to a width direction (X axis) of the determining region R3 is smaller than a preset determining angle. In addition, in a case in which the edge angle θ is smaller than the determining angle, it is determined whether at least skewing does not occur, or the skewing falls in an allowable level, even when the skewing occurred, and subsequently, the edge length of the tip end portion PF is determined.

In a case in which the edge angle θ is the determining angle or more, that is, the degree of skewing exceeds the allowable level, the process proceeds to step S8 (which will be described later).

FIG. 6 illustrates an example in a case in which the medium P is normally transported, that is, without causing skewing, and FIG. 7 illustrates an example in a case in which skewing occurred. In addition, the edge of the tip end portion PF is formed in a stepwise shape because of a resolution of the imaging unit 44 (number of pixels).

Subsequently, though it depends on a calculating method of the edge angle θ, for example, in a case in which a tip end of a sheet is deformed due to trapping of the tip end of the sheet, not skewing (state of being jammed or state before being jammed), as illustrated in FIG. 8, there is also a case in which the edge angle θ in the determining region R3 which is calculated falls in the determining angle, as a result.

Accordingly, the control unit 30 also determines the edge length, in addition to the determination of the edge angle θ in the determining region R3. Whether the edge length is good or bad is determined by a size of the edge length of the tip end portion PF with respect to a length W1 in the width direction of the determining region R3 (hereinafter, referred to as "edge determining length W1").

For example, in a case in which the medium P is normally transported into the determining region R3 without skewing or jamming, as illustrated in FIG. 6, the edge length of the tip end portion PF becomes at least W1, or more than W1.

However, in the skewing state as illustrated in FIG. 7, or the jamming state as illustrated in FIG. 8, the edge length of the tip end portion PF (W2 in FIG. 7, and W3 in FIG. 8) becomes the edge determining length W1 or less. Accordingly, in this case, it is determined as transport disorder, and process proceeds to step S8 (which will be described later).

By also determining the edge length, in addition to the edge angle θ of the tip end portion PF in the determining region R3, in this manner, it is possible to more reliably detect transport disorder.

In addition, in a case in which both of the edge angle θ of the tip end portion PF and the edge length in the determining region R3 are good, the process proceeds to step S7, and the control unit 30 continues transporting of the medium P to the downstream side in the transport direction. In addition, when the tip end portion PF of the medium P is detected by the second medium detecting sensor 52, the control unit 30 stops a rotation of the feeding roller 34, and starts image reading of the medium P in the image reading unit 54. In addition, the control unit 30 ends the image reading job by stopping the rotation of pair of transport rollers 50 and the pair of discharging rollers 56, after transporting the medium P by a predetermined amount, after detecting of the rear end of the medium P by the second medium detecting sensor 52.

Meanwhile, in a case of the transport disorder as illustrated in FIG. 7 or 8, the control unit 30 stops a rotation of the feeding roller 34 in step S8, and stops transporting of the medium. In addition, the control unit 30 ends the image reading job by emitting an error signal in step S9.

As described above, the control unit 30 can accurately determine the transport disorder, immediately after feeding by the feeding roller 34, in a case in which skewing or jamming occurred in the medium P, that is, in a case in which transport disorder occurred, based on the image data imaged by the imaging unit 44, and as a result, it is possible to reduce a damage of the medium P, since feeding of the medium P is stopped early.

Second Embodiment

Subsequently, a transport control of the medium P according to a second embodiment will be described with reference to FIGS. 10 to 12. A difference in the embodiment from the above described first embodiment is the determining method of the transport disorder illustrated in step S6 in FIG. 9, and since the other feeding controls are the same as those in the above described first embodiment, descriptions thereof will be omitted.

In the embodiment, though it will be described in detail later, broadly, in the image data in the segmented region R2, averaged brightness as a value in which brightness of a pixel group is averaged along the device width direction (medium width direction) is obtained along the medium transport direction. In addition, whether or not there is transport disorder of the medium P is determined based on a determination on whether or not a high value in the averaged brightness is higher than the first threshold value L1 as a threshold value for determining a state in which the medium is present, and a determination on whether or not a low value in the averaged brightness is lower than the second threshold value L2 as a threshold value for determining a state in which the medium is absent. In addition, the second threshold value L2 is set to be lower than the first threshold value L1.

When describing while referring to drawings, in the embodiment, the control unit 30 averages brightness of a pixel group on the same line along the device width direction (medium width direction) with respect to image data in the segmented region R2, as illustrated in FIG. 10, and obtains averaged brightness. This process is performed along the medium width direction. Here, the left side of a paper face in FIGS. 10 to 12 denotes a state of the segmented region R2 imaged by the imaging unit 44, and the graph on the right side of the paper face denotes averaged brightness obtained based on the image data in the segmented region R2. In addition, the hatched portion in the segmented region R2 in FIGS. 10 to 12 denotes a region of the imaged path member 46.

In FIGS. 10 to 12, the first threshold value L1 is set to a value of brightness which can determine a state in which a medium is present. In addition, a value L3 with high brightness (value denoting presence of sheet) has brightness higher than the first threshold value L1. Meanwhile, the second threshold value L2 is set to a value with brightness which can determine an absent state of a medium. In addition, the value L3 with low brightness (value denoting absent state of sheet) has brightness lower than the second threshold value L2.

FIG. 10 illustrates a normal transport state, and in the normal transport state, a line denoting averaged brightness becomes a straight line which directly erects (falls down) at the position of the tip end portion PF.

In this manner, at a position Y1 on the upstream side in the medium transport direction in the determining region R3, averaged brightness exceeds the first threshold value L1, and becomes L3. In addition, at a position Y2 on the downstream side in the transport direction, averaged brightness is lower than the second threshold value L2, and becomes L4. In this manner, the control unit 30 can determine that it is a normal transport state.

Meanwhile, in a case in which the medium P is skewed as illustrated in FIG. 11, a line denoting averaged brightness is inclined.

In this manner, averaged brightness is lower than the first threshold value L1 at the position Y1 on the upstream side in the medium transport direction in the determining region R3, and averaged brightness exceeds the second threshold value L2 at the position Y2 on the downstream side in the transport direction. In this manner, the control unit 30 can determine that transport disorder has occurred.

In addition, in a case in which jamming occurs as illustrated in FIG. 12, a line denoting averaged brightness is inclined, and the inclination becomes steep compared to that in the case of skewing illustrated in FIG. 11.

In this manner, averaged brightness exceeds the first threshold value L1 at the position Y1 on the upstream side in the medium transport direction in the determining region R3; however, averaged brightness exceed the second threshold value L2 at the position Y2 on the downstream side in the transport direction. In this manner, the control unit 30 can determine an occurrence of transport disorder.

As described above, the control unit 30 performs averaging of a value of brightness based on image data imaged by the imaging unit 44, and can accurately determine transport disorder immediately after feeding by the feeding roller 34, by comparing the averaged brightness with the first threshold value L1 and the second threshold value L2. As a result, it is possible to reduce a damage of the medium P since feeding of the medium P is stopped early.

In addition, the control unit 30 in the above described embodiment determines transport disorder by comparing averaged brightness at the position Y1 on the upstream side in the medium transport direction and the position Y2 on the downstream side in the transport direction with the first threshold value L1 and the second threshold value L2; however, transport disorder may be determined based on an inclination of a straight line of averaged brightness in the determining region R3, by obtaining thereof.

Modification Example of First Embodiment and Second Embodiment

In the embodiment, the imaging unit 44 is disposed at the center portion in the device width direction of the medium transport path 26; however, instead of this configuration, the imaging unit 44 may be disposed at portions other than the center portion in the device width direction in the medium transport path 26. According to such a configuration, it is possible to reliably detect jamming which occurs at portions other than the center portion in the device width direction in the medium transport path 26.

Third Embodiment

Subsequently, a third embodiment will be described with reference to FIGS. 13 to 17. In the embodiment, the medium feeding device 58 further includes a detecting unit 60. As illustrated in FIG. 13, the detecting unit 60 is provided with a driven roller 62 which rotates in a driven manner by being in contact with the feeding roller 34, a roller support member 64 which supports the driven roller 62, an angle detecting sensor 66 which detects a swing angle of the roller support member 64, and an urging unit 68 which urges the driven roller 62 toward the feeding roller 34. In addition, the urging unit 68 is configured of a coil spring, as an example.

Here, when the feeding roller 34 rotates, also the driven roller 62 starts rotating in a driven manner. At this time, in the feeding roller 34, a position on the surface of the roller is changed due to eccentric, abrasion of the roller surface, or the like. Accordingly, a position of the driven roller 62 is also changed following a positional change of the feeding roller 34. In this manner, the roller support member 64 which supports the driven roller 62 swings. The angle detecting sensor 66 detects an amount of change in position of the feeding roller 34 through a swing of the roller support member 64.

When referring to FIG. 17, a power supply of the scanner 10 is set to an ON state, as step S10. In addition, the control unit 30 rotatably driving the feeding roller 34 as step S11, and detects an initial changing amount of the changing amount of a position of the feeding roller 34 using the angle detecting sensor 66. Subsequently, the control unit 30 receives a start signal of the image reading job as step S12. In addition, the control unit 30 causes feeding of the medium P to be started, by rotatably driving the feeding roller 34, the separating roller 36, and the transport driving roller 50a as step S13.

In addition, the control unit 30 determines whether or not the changing amount of a position of the feeding roller 34 when feeding the medium P is a threshold value L5 or less as step S14. Here, when referring to FIG. 14, the threshold value L5 is set to be larger than a changing amount of a position when the medium P is normally fed by the feeding roller 34. When the medium P is normally fed by the feeding roller 34, as illustrated in FIG. 14, the control unit 30 proceeds to step S15, since the changing amount of a position of the feeding roller 34 is smaller than the threshold value L5. In addition, in a case in which the changing amount of a position of the feeding roller 34 is the threshold value L5 or more, the process proceeds to step S16 which will be described later.

In addition, the control unit 30 continues transporting of the medium P to the downstream side in the transport direction in step S15, and ends the image reading job after performing image reading of the medium P in the image reading unit 54.

Meanwhile, as illustrated in FIG. 15, in a case in which jamming occurs when the feeding roller 34 transports the medium P, a position of the feeding roller 34 is changed in a direction separated from the separating roller 36. In addition, the change of the feeding roller 34 is detected by the angle detecting sensor 66. As illustrated in FIG. 16, when the medium P causes jamming, a changing amount of a position of the feeding roller 34 exceeds the threshold value L5. In addition, a portion with a dashed line in FIG. 15 denotes a position of the feeding roller 34 in the initial state.

Accordingly, in a case in which the control unit 30 determines that the changing amount of a position of the feeding roller 34 exceeds the threshold value L5 in step S14, the process proceeds to step S16. In addition, the control unit 30 stops a rotation of the feeding roller 34. Subsequently, the control unit 30 emits an error signal as step S17, and stops the image reading job.

In the embodiment, since the change amount of the feeding roller 34 is directly monitored, it is possible to immediately stop a rotation of the feeding roller 34 in a case in which disorder occurs in feeding of the medium P, and accordingly, it is possible to further reduce a damage of the medium P. In addition, in the embodiment, since an initial changing amount of the feeding roller 34 is read at a time of power ON of the scanner 10, it is possible to monitor an amount of abrasion of the feeding roller 34, and suppress erroneous detecting when the feeding roller 34 is worn out.

Modification Example of Third Embodiment (1) In the embodiment, it is configured so that a changing amount of a position of the feeding roller 34 is detected by the detecting unit 60; however, it may be a configuration in which a changing amount of a position of the separating roller 36 is detected, instead of the configuration. Specifically, a configuration in which the detecting unit 60 is provided on the separating roller 36 side, as illustrated in FIG. 18, the driven roller 62 is caused to come into contact with the separating roller 36, and a changing amount of a position of the separating roller 36 is detected by the angle detecting sensor 66 may be adopted. With such a configuration, it is also possible to detect jamming of the medium P, by detecting the changing amount of a position of the separating roller 36.

(2) In the embodiment, it is configured so that a changing amount of a position of the feeding roller 34 is detected by the angle detecting sensor 66; however, instead of the configuration, it may be a configuration in which the number of rotations of the feeding roller 34 is detected by a rotation detecting sensor 70. Specifically, as illustrated in FIG. 19, a detecting unit 72 is provided with a rotation detecting sensor 70 which comes into contact with the feeding roller 34, a sensor support member 76 which supports the rotation detecting sensor 70 by having a swing shaft 74 as a fulcrum, and an urging unit 68.

In this configuration, a change in the number of rotations of the feeding roller 34 is detected by the rotation detecting sensor 70. Here, since there is a change in the number of rotations of the feeding roller 34 when jamming occurs in the medium P, it is possible to detect feeding disorder of the medium P by monitoring the change in the number of rotations, and further reduce a damage of the medium P by immediately stopping a rotation of the feeding roller 34.

Modification Example of First to Third Embodiments

The imaging unit 44, or the detecting units 60 and 72 are applied to the scanner 10; however, instead of the configuration, the imaging unit 44, or the detecting units 60 and 72 may be applied to a printer including a recording head, as an example of a recording apparatus.

When summarizing the above descriptions, the medium feeding device 58 is provided with the medium mounting portion 16a for mounting the medium P, the feeding roller 34 for feeding the medium P from the medium mounting portion 16a, the separating roller 36 for separating the medium P by nipping the medium between the feeding roller 34 and the separating roller, the imaging unit 44 for imaging the tip end portion PF of the medium P from a position of facing a face of the medium P on the downstream side of the nipping position of the medium P using the feeding roller 34 and the separating roller 36, and the control unit 30 which determines whether or not there is transport disorder, by evaluating a state of a boundary between the path member 46 which forms the medium transport path 26 and the tip end portion PF of the medium P, from the image data obtained by the imaging unit 44.

According to the above described configuration, since the medium feeding device 58 is provided with the imaging unit 44 for imaging the tip end portion PF of the medium P from a position of facing a face of the medium P on the downstream side of the nipping position of the medium P using the feeding roller 34 and the separating roller 36, and the control unit 30 which determines whether or not there is transport disorder, by evaluating a state of a boundary between the path member 46 which forms the medium transport path 26 and the tip end portion PF of the medium P, from the image data obtained by the imaging unit 44, it is possible to further reliably determine a state of the tip end portion PF of the medium P, and further accurately detect transport disorder of the medium P.

The control unit 30 sets the rectangular determining region R3 which includes at least a part of the boundary with respect to the image data, and determines whether or not there is transport disorder based on a length of the boundary in the determining region R3, that is, the edge length. According to the configuration, it is possible to determine whether or not there is transport disorder using an easy method.

The control unit 30 determines whether or not there is transport disorder based on an edge angle of the boundary in the determining region R3, with respect to the device width direction as the medium width direction which is orthogonal to the medium transport direction. According to the configuration, it is possible to determine whether or not there is transport disorder using an easy method, and easily detect skewing as one of transport disorder, in particular.

The control unit 30 obtains averaged brightness as a value in which brightness of a pixel group which goes along the device width direction as the medium width direction which is orthogonal to the medium transport direction, along the medium transport direction from the image data, and the control unit 30 can obtain the first threshold value L1 as a threshold value with respect to averaged brightness, and is a threshold value for determining a present state of the medium P, and the second threshold value L2 as a threshold value for determining an absent state of the medium P, and is lower than the first threshold value L1, and determines whether or not there is transport disorder based on highs and lows of the value L3 with high brightness with respect to the first threshold value L1, and highs and lows of the value L4 with low brightness with respect to the second threshold value L2, in averaged brightness at both ends of the determining region R3 which includes at least a part of the boundary.

According to the configuration, since the control unit 30 obtains averaged brightness as a value in which brightness of a pixel group which goes along the medium width direction as the direction orthogonal to the medium transport direction, along the medium transport direction from the image data, and determines whether or not there is transport disorder based on highs and lows of the value L3 with high brightness with respect to the first threshold value L1, and highs and lows of the value L4 with low brightness with respect to the second threshold value L2, in averaged brightness at both ends of the determining region R3 which includes at least a part of the boundary, it is possible to easily recognize a state of the tip end portion PF of the medium P.

In a case in which the control unit 30 determines that there is transport disorder, the feeding roller 34 is stopped. According to the configuration, it is possible to avoid a failure of the device which is caused when the feeding roller 34 is operated in a state in which transport disorder occurred.

The feeding roller 34 which configures the feeding unit, and is rotatably driven by the feeding driving motor 32, the separating roller 36 which configures the separating unit, and rotates in a driven manner by being in contact with the feeding roller 34, and the detecting unit 60 which detects a changing amount of a position of at least any one of the feeding roller 34 and the separating roller 36 with respect to the other roller 34 or 36 are provided. According to the configuration, it is possible to detect jamming of the medium P, by detecting the jamming when the feeding roller 34 or the separating roller 36 is displaced due to an occurrence of jamming of the medium P.

The detecting unit 60 is provided with the driven roller 62 which rotates in a driven manner by being in contact with the feeding roller 34 or the separating roller 36 as a target for detecting the changing amount of a position, the roller support member 64 which rotatably supports the driven roller 62, and can swing around a swing fulcrum, and the angle detecting sensor 66 which detects a swing angle of the roller support member 64. According to the configuration, it is possible to configure the detecting unit 60 at a low cost, by making a structure thereof simple.

The scanner 10 is provided with the image reading unit 54 which reads the medium P, and the medium feeding device 58. Alternatively, a recording apparatus, for example, a printer is provided with a recording head which performs recording on the medium P, and the medium feeding device 58.

The invention is not limited to the above described embodiments, and can be variously modified in the scope of the invention which is described in claims, and it is needless to say that those are also included in the scope of the invention.

The entire disclosure of Japanese Patent Application No. 2016-256416, filed Dec. 28, 2016 is expressly incorporated by reference herein.

What is claimed is:

1. A medium feeding device comprising:
a medium mounting unit on which a medium is mounted;
a feeding unit which feeds the medium from the medium mounting unit;
a separating unit which separates the medium between the feeding unit and the separating unit by nipping the medium;
an imaging unit which images a medium tip end portion from a position of facing a face of the medium on a downstream side of a nipping position of the medium using the feeding unit and the separating unit; and
a determining unit which determines whether or not there is transport disorder by evaluating a state of a boundary between a path member which forms a medium transport path and a medium tip end from image data obtained by the imaging unit,
the determining unit obtaining averaged brightness as a value in which brightness of a pixel group which goes along the medium width direction as a direction orthogonal to the medium transport direction is averaged along the medium transport direction from the image data,
the determining unit being configured to obtain a first threshold value as a threshold value with respect to the averaged brightness for determining a present state of a medium, and a second threshold value as a threshold value for determining an absent state of the medium which is lower than the first threshold value, and
the determining unit determining whether or not there is the transport disorder based on highs and lows of a value with high brightness with respect to the first threshold value, and highs and lows of a value with low brightness with respect to the second threshold value, in the averaged brightness at both ends of a determining range including at least a part of the boundary.

2. The medium feeding device according to claim 1, wherein the determining unit sets a rectangular determining region including at least a part of the boundary with respect to the image data, and determines whether or not there is the transport disorder based on a length of the boundary in the determining region.

3. The medium feeding device according to claim 2, wherein the determining unit determines whether or not there is the transport disorder based on an angle of the boundary in the determining region to a medium width direction as a direction orthogonal to the medium transport direction.

4. The medium feeding device according to claim 1, wherein, in a case in which the determining unit determines that there is the transport disorder, the feeding unit is stopped.

5. The medium feeding device according to claim 1, further comprising:
a feeding roller which configures the feeding unit, and is rotatably driven by a driving source;
a separating roller which configures the separating unit, and is rotated in a driven manner by being in contact with the feeding roller; and
a detecting unit which detects a changing amount of a position of at least any one of the feeding roller and the separating roller with respect to the other roller.

6. The medium feeding device according to claim 5, wherein the detecting unit includes a driven roller which rotates in a driven manner by being in contact with the feeding roller or the separating roller as a target for detecting the changing amount of a position, a roller support member which rotatably supports the driven roller and is configured to swing around a swing fulcrum, and an angle detecting sensor which detects a swing angle of the roller support member.

7. An image reading apparatus comprising:
a reading unit which reads a medium; and
the medium feeding device according to claim 1.

8. A recording apparatus comprising:
a recording unit which performs recording on a medium; and
the medium feeding device according to claim 1.

* * * * *